US008683075B1

United States Patent
Joffe et al.

(10) Patent No.: US 8,683,075 B1
(45) Date of Patent: *Mar. 25, 2014

(54) DISTRIBUTED COMPUTING SYSTEM AND METHOD FOR DISTRIBUTING USER REQUESTS TO REPLICATED NETWORK SERVERS

(75) Inventors: Rodney Lance Joffe, Phoenix, AZ (US); Barry A. Dykes, Phoenix, AZ (US); Jason Alan Brittain, Fairfield, CA (US); Victor Joseph Oppleman, Phoenix, AZ (US); Brian Everett Pettingell, Phoenix, AZ (US); James Joseph Lippard, Phoenix, AZ (US); Ian Burke Vandeventer, Tempe, AZ (US); Brett Dean Watson, Beaverton, OR (US); Steven Michael Hotz, Marina del Rey, CA (US); Nils Herbert McCarthy, Phoenix, AZ (US)

(73) Assignees: Verizon Corporate Services Group Inc., Basking Ridge, NJ (US); Raytheon BBN Technologies Corp., Cambridge, MA (US)

( * ) Notice: Subject to any disclaimer, the term of this patent is extended or adjusted under 35 U.S.C. 154(b) by 2924 days.

This patent is subject to a terminal disclaimer.

(21) Appl. No.: 09/714,150

(22) Filed: Nov. 16, 2000

Related U.S. Application Data

(63) Continuation of application No. 08/965,848, filed on Nov. 7, 1997, now Pat. No. 6,185,619.

(60) Provisional application No. 60/032,484, filed on Dec. 9, 1996.

(51) Int. Cl.
*G06F 15/173* (2006.01)

(52) U.S. Cl.
USPC .......................................................... 709/238

(58) Field of Classification Search
USPC .......................... 709/242, 244, 243, 238–241
See application file for complete search history.

(56) References Cited

U.S. PATENT DOCUMENTS

| | | | | |
|---|---|---|---|---|
| 4,399,531 | A | 8/1983 | Grande et al. | 370/60 |
| 4,587,651 | A | 5/1986 | Nelson et al. | 370/88 |
| 4,771,424 | A * | 9/1988 | Suzuki et al. | 370/400 |
| 4,873,517 | A | 10/1989 | Baratz et al. | 340/825.03 |

(Continued)

FOREIGN PATENT DOCUMENTS

| | | | | |
|---|---|---|---|---|
| EP | 0648038 A | 12/1995 | | H04L 29/06 |
| JP | 08-087473 | 2/1996 | | |

OTHER PUBLICATIONS

Hedrick, C.; RFC 1058: Routing Information Protocol; Jun. 1988; pp. 5, 7.*

(Continued)

*Primary Examiner* — Douglas Blair
*Assistant Examiner* — Benjamin Ailes

(57) ABSTRACT

Routing requests for data objects from clients includes receiving a request for a data object from a client, providing content servers capable of serving data objects, determining a server from the content servers, and informing the client of an address associated with the determined server accessible by the selected route. Determining a server includes, for each content server, identifying routes between the content server and the client, determining traversal times for the routes, and selecting a route from among the routes based on the traversal times.

23 Claims, 15 Drawing Sheets

(56) References Cited

U.S. PATENT DOCUMENTS

| | | | |
|---|---|---|---|
| 4,958,341 A | 9/1990 | Hemmady et al. | 370/60.1 |
| 5,001,472 A * | 3/1991 | Fischer et al. | 370/455 |
| 5,218,601 A | 6/1993 | Chujo et al. | 370/16 |
| 5,231,631 A | 7/1993 | Buhrke et al. | 370/60 |
| 5,278,829 A | 1/1994 | Dunlap | 370/94.1 |
| 5,323,394 A | 6/1994 | Perlman | 370/85.13 |
| 5,329,623 A | 7/1994 | Smith et al. | 395/275 |
| 5,341,477 A * | 8/1994 | Pitkin et al. | 709/226 |
| 5,347,633 A | 9/1994 | Ashfield et al. | 395/200 |
| 5,351,237 A | 9/1994 | Shinohara et al. | 370/58.3 |
| 5,361,259 A | 11/1994 | Hunt et al. | 370/84 |
| 5,398,012 A | 3/1995 | Derby et al. | 340/825.03 |
| 5,404,451 A | 4/1995 | Nemirovsky et al. | 395/200 |
| 5,414,698 A | 5/1995 | Adams | 370/17 |
| 5,416,842 A | 5/1995 | Aziz | 380/30 |
| 5,422,878 A | 6/1995 | Kimoto et al. | 370/60 |
| 5,434,863 A | 7/1995 | Onishi et al. | 370/85.13 |
| 5,436,902 A | 7/1995 | McNamara et al. | 370/85.3 |
| 5,442,630 A | 8/1995 | Gagliardi et al. | 370/85.13 |
| 5,444,782 A | 8/1995 | Adams, Jr. et al. | 380/49 |
| 5,452,294 A | 9/1995 | Natarajan | 370/54 |
| 5,452,330 A | 9/1995 | Goldstein | 375/257 |
| 5,455,826 A | 10/1995 | Ozveren et al. | 370/60 |
| 5,459,720 A | 10/1995 | Iliev et al. | 370/60 |
| 5,475,685 A | 12/1995 | Garris et al. | 370/82 |
| 5,485,455 A | 1/1996 | Dobbins et al. | 370/60 |
| 5,490,252 A | 2/1996 | Macera et al. | 395/200.01 |
| 5,491,694 A | 2/1996 | Oliver et al. | 370/85.4 |
| 5,499,297 A | 3/1996 | Boebert | 380/23 |
| 5,517,620 A | 5/1996 | Hashimoto et al. | 395/200.15 |
| 5,519,836 A | 5/1996 | Gawlick et al. | 395/200.15 |
| 5,521,910 A | 5/1996 | Matthews | 370/54 |
| 5,539,883 A | 7/1996 | Allon et al. | 395/200.11 |
| 5,544,169 A | 8/1996 | Norizuki et al. | 370/60.1 |
| 5,546,452 A | 8/1996 | Andrews et al. | 379/219 |
| 5,548,533 A | 8/1996 | Gao et al. | 364/514 C |
| 5,548,724 A * | 8/1996 | Akizawa et al. | 709/203 |
| 5,572,643 A | 11/1996 | Judson | 395/793 |
| 5,581,552 A | 12/1996 | Civaniar et al. | 370/396 |
| 5,596,719 A | 1/1997 | Ramakrishnan et al. | 395/200.02 |
| 5,600,794 A | 2/1997 | Callon | 395/200.01 |
| 5,603,029 A | 2/1997 | Aman et al. | 395/675 |
| 5,617,540 A * | 4/1997 | Civanlar et al. | 370/395.54 |
| 5,627,971 A | 5/1997 | Miernik | 395/200.15 |
| 5,644,713 A | 7/1997 | Makishima | 395/200.01 |
| 5,646,943 A | 7/1997 | Elwalid | 370/230 |
| 5,721,904 A * | 2/1998 | Ito et al. | 707/769 |
| 5,774,660 A | 6/1998 | Brendel et al. | 395/200.31 |
| 5,774,668 A | 6/1998 | Choquier et al. | 395/200.53 |
| 5,805,824 A * | 9/1998 | Kappe | 709/242 |
| 5,828,847 A | 10/1998 | Gehr et al. | 395/200.69 |
| 5,862,339 A * | 1/1999 | Bonnaure et al. | 709/227 |
| 5,867,706 A | 2/1999 | Martin et al. | 395/675 |
| 5,878,212 A * | 3/1999 | Civanlar et al. | 709/203 |

OTHER PUBLICATIONS

Rekhter, Y., RFC 1771 "A Border Gateway Protocol 4 (BGP-4)" Mar. 1995, Network Working Group T.J. Watson Research Center, IBM Corp., pp. 1-57.*
European Search Report, PCT Application No. PCT/US 97/22542.
Office Stack Quick Start Guide.
Office Stack Installation Guide (1994).
Multi-Tenant System Manager Manual.
Intellicom Ethernet Switching (1994).
Side Winder Products Document (1995).
http://networkcomputing.com/814/8141cc.html, Aug. 1, 1997, 4 pages.
"Load Balancing for Multiple Interfaces for Transmission Control Protocol/Internet Protocol VM/MVS", vol. 38, Pub. No. 9, Sep. 1995,—IBM Technical Disclosure Bulletin—pp. 7-10.
Katz et al., "A Scalable HTTP Server: The NCSA Prototype", Computer Networks and ISDN Systems archive, vol. 27, Issue 2, Nov. 1994, pp. 155-164.

* cited by examiner ial pairing capability, colocating the server at the service provider's site can yield a much better connection to the rest of the internet. Another approach is the use of distributed servers. Place identical content servers at strategic locations around the world. For example, one in New York, one in San Francisco, and one in London. This distributes the load to multiple servers and keeps traffic closer to the requester. Another approach is to cluster servers. Clustering enables sharing of hard drive arrays across multiple servers. Another approach is the server farm. This entails the use of multiple webservers with identical content, or the segmentation based upon functionality. For example, two servers for web functions, two for FTP, two as a database and so forth. A variation on the server farm is the distributed server farm. This places server farms at strategic locations—essentially combining the server farm with the distributed server approach.

DISTRIBUTED COMPUTING SYSTEM AND METHOD FOR DISTRIBUTING USER REQUESTS TO REPLICATED NETWORK SERVERS

CROSS REFERENCE TO RELATED APPLICATIONS

This application is a continuation of, and claims the benefit of priority under 35 U.S.C. §120 to, U.S. application Ser. No. 08/965,848, Rodney L. Joffe, et al., entitled "Method and Apparatus for Balancing the Process Load on Network Servers According to Network and Server Based Policies," filed Nov. 7, 1997 now U.S. Pat. No. 6,185,619, which application claims the benefit of U.S. Provisional Application 60/032,484, Rodney L. Joffe, et al., entitled, "A Distributed Computing System and Method for Distributing User Requests to Replicated Network Servers," filed Dec. 9, 1996. All of the foregoing applications are hereby incorporated by reference herein in their entireties.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to the field of distributed computer systems, and more specifically to computing systems and methods for assigning requests to one of a multiplicity of network servers based upon best criteria such as the speed of the underlying network infrastructure.

The explosive growth of the World Wide Web needs little introduction. Not only are members of the technical community finding an ever greater number of technical and informational resources available on the World Wide Web, but also the mainstream populace is finding favorite restaurants, car makes and churches sporting new websites. The popularity of the World Wide Web as a communications medium lies in the richness of its information content and ease of use. Information in this medium exists as objects in a widely distributed collection of internetworked servers, each object uniquely addressable by its own uniform resource locator (URL). Since its inception, the World Wide Web has achieved a global prominence in everyday life and commerce.

Yet this explosive growth has not been had without difficulty. The proliferation of commercial applications brings with it an ever increasing number of users making ever increasing numbers of inquiries. The problems of latency and bandwidth constraints manifest themselves in delay, lost information and the distraught customers.

Network architects respond using an array of solutions. Many responses fall within the category of solutions based upon supplying more computing power. This may encompass such alternatives as different web server software, web server hardware or platform, increases in RAM or CPU in the server, application rewrites, or increasing network bandwidth by upgrading hardware. Another class of solutions involves using multiple servers or locating servers strategically. One method in this class is to locate the server at the internet service provider. By selecting a service provider with a opti- The multiple and distributed server approaches solve one problem at the expense of creating another. If there are multiple servers, how does the end user locate your site? Presently, names and universal resource locators (URLs) are resolved into unique single addresses by a domain name service (DNS). DNS servers maintain a list of domain names cross referenced to individual IP addresses. However, if multiple web servers or server farms are used, the DNS system must be modified. A common approach to this problem is to modify the DNS system to a one to many mapping of names to IP addresses. Thus the DNS will return a list of IP addresses for any particular web object. These may then be handed out to the various clients in a round-robin fashion. There are, however, several drawbacks to this approach. The round-robin paradigm returns IP addresses in a strict order with little regard to the location of the requester or the server. The scheme has no knowledge of server architecture or loading. The selection simply progresses down a simple list. One server may receive all heavy duty users. Additionally the weakest link determines the overall performance, so server platforms need to be kept in relatively parity. Another problem is that the DNS simply returns IP addresses with no regard as to whether the server to which the address corresponds is operational. Consequently, if one of the round-robin servers happens to be off-line for maintenance, DNS continues to give out the address, and potential users continue to receive time-out error responses. Thus, the round-robin modification of DNS makes a broad attempt to solve the distributed server problem. However, there is no regard to network traffic, low balancing among servers or reliability issues.

Several products on the market purport to address these problems, but these prior efforts all suffer the drawback that they require that the user software environment be modified in order to facilitate replicated server selection. A scheme that requires user software modifications is less desirable due to the practical problems of ensuring widespread software distribution. Such schemes are, at best, useful as optimization techniques.

One such class of approaches are those that rely on explicit user selection to assign a user request to a server. The user application may include additional steps that require the user to have sufficient knowledge, sophistication, and patience to make their own server selection. Such schemes are not always desirable for a number of reasons.

A technique based on selective host routing uses multiple replicated servers, all with the same network address, located at different points in the network topology. A router associated with each server captures incoming network traffic to the shared server address, and forwards the traffic to the specific server. This technique can only statically distribute the client request load to the nearby server, with no consideration of server load or other network characteristics.

The BIND implementation of the Domain Name System server may include techniques to bind server names to different network addresses, where one of a set of different multiple addresses are assigned either sequentially or randomly. Service providers assign a different address to each replicated server, and BIND directs user requests to the alternative servers. This technique can only statically distribute the client request load to an arbitrary server, with no consideration of server load or other network characteristics.

SONAR is an emerging IETF (Internet Engineering Task Force) protocol for distributing network characteristics, in particular, for topological closeness. SONAR includes a data format for representing query requests and responses, but does not specify a mechanism for determining the network characteristics.

The Cisco Local Director is a product that works as a network traffic multiplexor that sits in front of multiple local servers, and distributes new transport connections to each server based on the amount of traffic flowing to the servers. This product does not consider network characteristics in its decision, and further requires that the replicated servers be collocated. Cisco Systems is a company headquartered in San Jose, Calif.

The Cisco Distributed Director redirects user requests to topologically distant servers based on information obtained from network routing protocols. The Distributed Director intercepts either incoming DNS requests or HTTP requests, and provides the appropriate response for redirection. This product does not consider server load, and only considers the restricted set of information available from routing protocols; this information is also limited in accuracy by the aggregation techniques required to enable scalable internet routing.

Although these products, taken together, consider server load and network characteristics, they do not make an integrated server selection. Yet, for all these efforts, the pundits' criticism still rings true, it is still the "world wide wait." For this reason, what is needed is a system which automatically selects an appropriate server from which to retrieve a data object for a user based upon the user's request, and the capabilities and topology of the underlying network.

SUMMARY OF THE INVENTION

The present invention provides the ability to assign requests for data objects made by clients among multiple network servers. The invention provides a distributed computing system and methods to assign user requests to replicated servers contained by the distributed computing system in a manner that attempts to meet the goals of a particular routing policy. Policies may include minimizing the amount of time for the request to be completed. For example, a system according to the invention may be configured to serve data objects to users according to the shortest available network path.

Specifically, the invention provides a system for routing requests for data objects from any number of clients based upon a "best server" routing policy to one of multiple content servers. Content servers serve data objects responsive to clients' requests via one or more network access points, in accordance with the decision of a director. The director determines based upon the routing policy the routing of said requests for data objects to a particular content server.

In accordance with a particular aspect of the invention, routing policies may comprise any of the following, a combination of any of the following, or none of the following: 1) the least number of open TCP connections; 2) the most available free RAM; 3) the most available free SWAP (virtual memory); 4) the highest amount of CPU idle time; or 5) the fastest ICMP route to the client's machine.

Advantages of the approaches according to the invention are increased tolerance of faults occurring in the underlying hardware and reliability over prior art web servers. The invention will be better understood upon reference to the following detailed description and its accompanying drawings.

DESCRIPTION OF THE SPECIFIC EMBODIMENTS

1.0 Introduction

A preferable embodiment of a server load balancing system according to the invention has been reduced to practice and will be made available under the trade name "HOPSCOTCH™."

A word about nomenclature is in order. Systems according to the present invention comprise a multiplicity of processes which may exist in alternative embodiments on any of a multiplicity of computers in a distributed networked environment or as concurrent processes running in virtual machines or address spaces on the same computer. To limit the exponential growth of names, the following conventions have been employed to enhance readability. Individual deviations will be noted where they occur. An 'xyz server' is a computer or virtual machine housing a collection of processes which make up xyz. An 'xyz component' is a collection of processes which perform a set of functions collectively referred to as xyz. An 'xyz' is the set of functions being performed by the xyz component on the xyz machine.

1.1 Hardware Overview

Figure 1A:
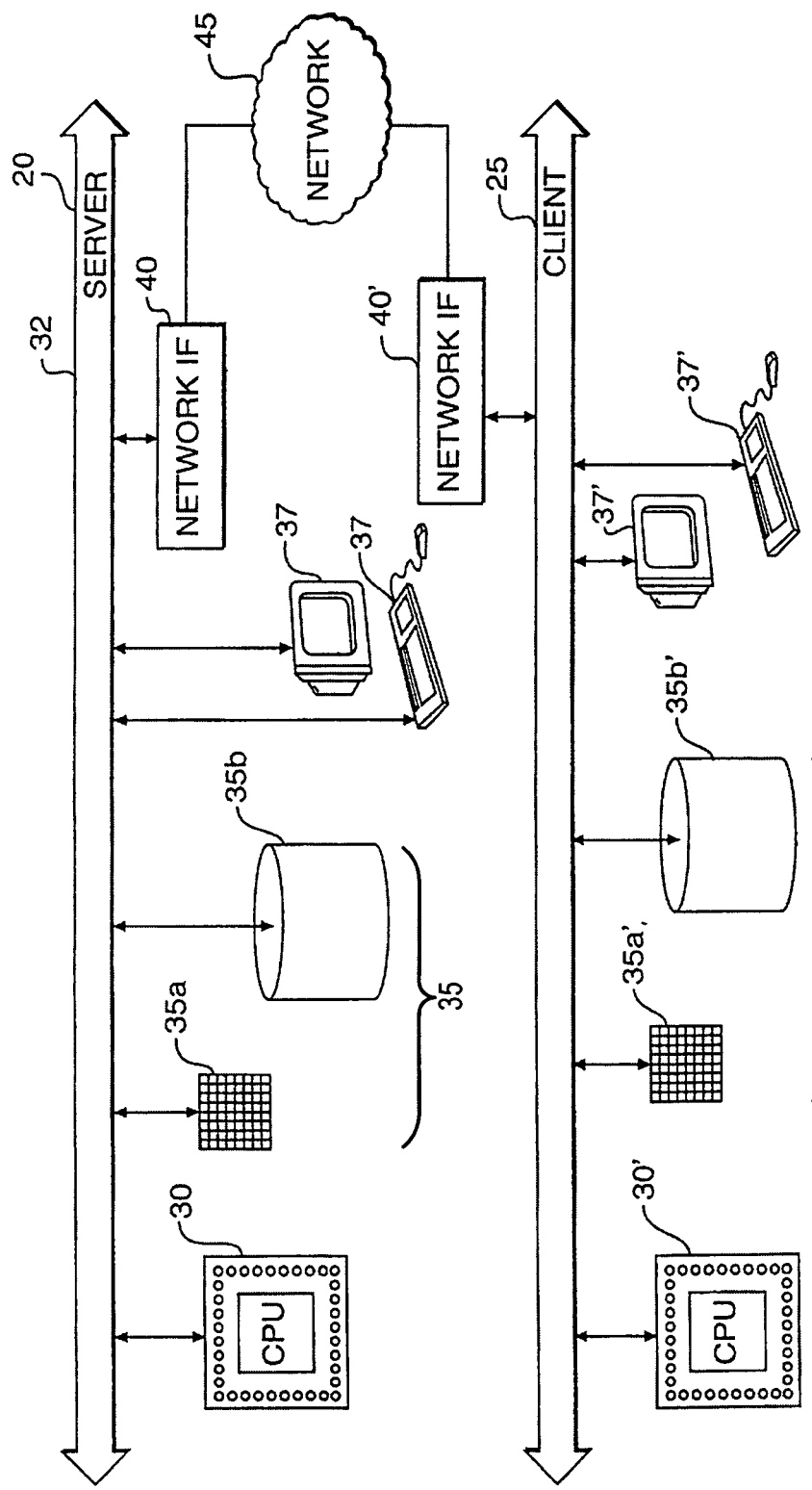
FIG. 1A depicts a representative client server relationship in accordance with a particular embodiment of the invention.

The distributed computing system for server load balancing (the "system") of the present invention is implemented in the Perl programming language and is operational on a computer system such as shown in FIG. 1A. This invention may be implemented in a client-server environment, but a client-server environment is not essential. FIG. 1A shows a conventional client-server computer system which includes a server 20 and numerous clients, one of which is shown as client 25. The use of the term "server" is used in the context of the invention, wherein the server receives queries from (typically remote) clients, does substantially all the processing necessary to formulate responses to the queries, and provides these responses to the clients. However, server 20 may itself act in the capacity of a client when it accesses remote databases located at another node acting as a database server.

The hardware configurations are in general standard and will be described only briefly. In accordance with known practice, server 20 includes one or more processors 30 which communicate with a number of peripheral devices via a bus subsystem 32. These peripheral devices typically include a storage subsystem 35, comprised of memory subsystem 35a and file storage subsystem 35b, which hold computer programs (e.g., code or instructions) and data, set of user interface input and output devices 37, and an interface to outside networks, which may employ Ethernet, Token Ring, ATM, IEEE 802.3, ITU X.25, Serial Link Internet Protocol (SLIP) or the public switched telephone network. This interface is shown schematically as a "Network Interface" block 40. It is coupled to corresponding interface devices in client computers via a network connection 45.

Client 25 has the same general configuration, although typically with less storage and processing capability. Thus, while the client computer could be a terminal or a low-end personal computer, the server computer is generally a high-end workstation or mainframe, such as a SUN SPARC™ server. Corresponding elements and subsystems in the client computer are shown with corresponding, but primed, reference numerals.

The user interface input devices typically includes a keyboard and may further include a pointing device and a scanner. The pointing device may be an indirect pointing device such as a mouse, trackball, touchpad, or graphics tablet, or a direct pointing device such as a touchscreen incorporated into the display. Other types of user interface input devices, such as voice recognition systems, are also possible.

The user interface output devices typically include a printer and a display subsystem, which includes a display controller and a display device coupled to the controller. The display device may be a cathode ray tube (CRT), a flat-panel device such as a liquid crystal display (LCD), or a projection device. Display controller provides control signals to the display device and normally includes a display memory for storing the pixels that appear on the display device. The display subsystem may also provide non-visual display such as audio output.

The memory subsystem typically includes a number of memories including a main random access memory (RAM) for storage of instructions and data during program execution and a read only memory (ROM) in which fixed instructions are stored. In the case of Macintosh-compatible personal computers the ROM would include portions of the operating system; in the case of IBM-compatible personal computers, this would include the BIOS (basic input/output system).

The file storage subsystem provides persistent (non-volatile) storage for program and data files, and typically includes at least one hard disk drive and at least one floppy disk drive (with associated removable media). There may also be other devices such as a CD-ROM drive and optical drives (all with their associate removable media). Additionally, the computer system may include drives of the type with removable media cartridges. The removable media cartridges may, for example be hard disk cartridges, such as those marketed by Syquest and others, and flexible disk cartridges, such as those marketed by Iomega. One or more of the drives may be located at a remote location, such as in a server on a local area network or at a site of the Internet's World Wide Web.

In this context, the term "bus subsystem" is used generically so as to include any mechanism for letting the various components and subsystems communicate with each other as intended. With the exception of the input devices and the display, the other components need not be at the same physical location. Thus, for example, portions of the file storage system could be connected via various local-area or wide-area network media, including telephone lines. Similarly, the input devices and display need not be at the same location as the processor, although it is anticipated that the present invention will most often be implemented in the context of PCs and workstations.

Bus subsystem 32 is shown schematically as a single bus, but a typical system has a number of buses such as a local bus and one or more expansion buses (e.g., ADB, SCSI, ISA, EISA, MCA, NuBus, or PCI), as well as serial and parallel ports. Network connections are usually established through a device such as a network adapter on one of these expansion buses or a modem on a serial port. The client computer may be a desktop system or a portable system.

The user interacts with the system using interface devices 37' (or devices 37 in a standalone system). For example, client queries are entered via a keyboard, communicated to client processor 30', and thence to network interface 40' over bus subsystem 32'. The query is then communicated to server 20 via network connection 45. Similarly, results of the query are communicated from the server to the client via network connection 45 for output on one of devices 37' (say a display or a printer), or may be stored on storage subsystem 35'.

Figure 1B:
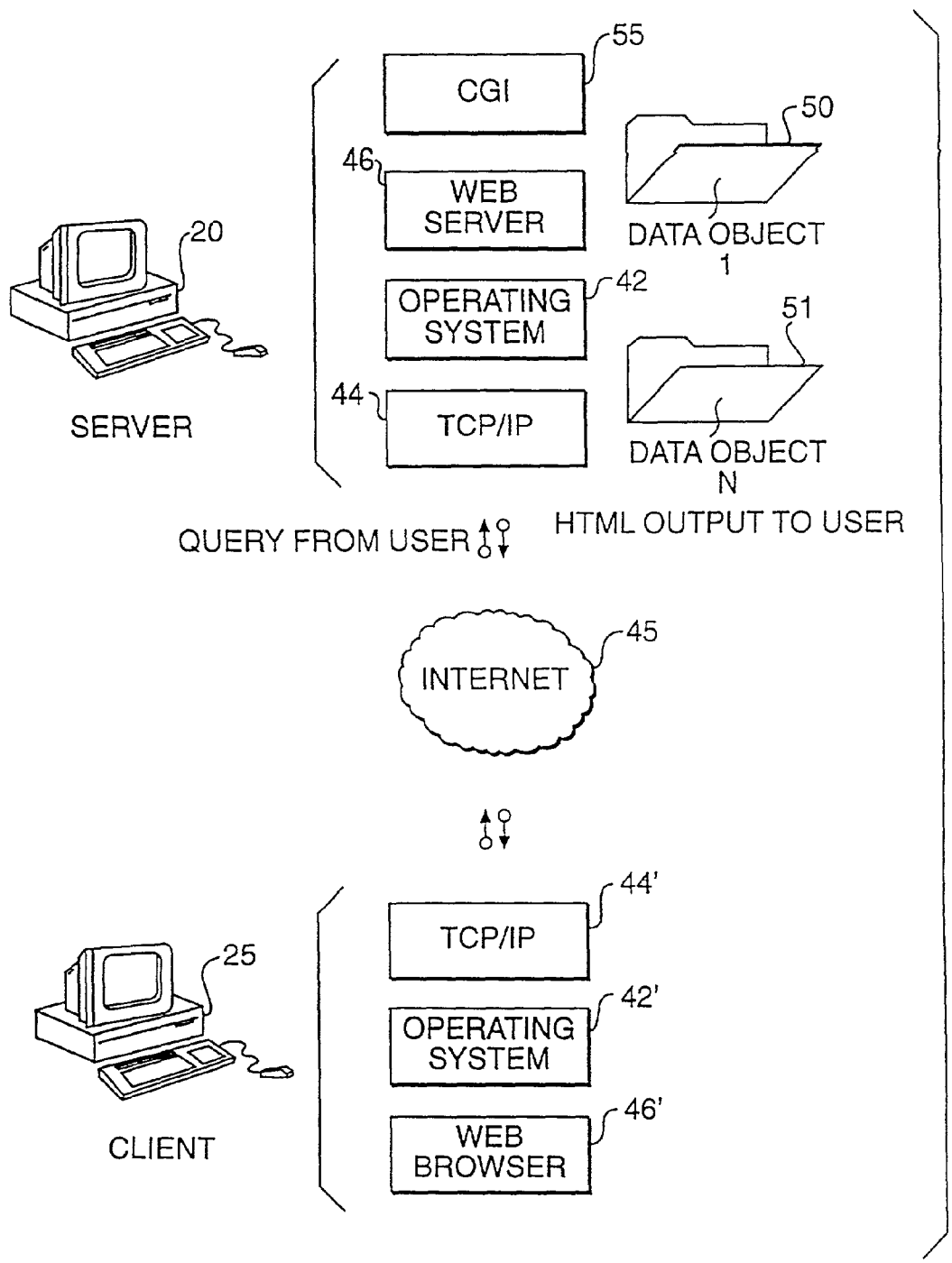
FIG. 1B depicts a functional perspective of the representative client server relationship in accordance with a particular embodiment of the invention.

FIG. 1B is a functional diagram of the computer system of FIG. 1A. FIG. 1B depicts a server 20, and a representative client 25 of a multiplicity of clients which may interact with the server 20 via the internet 45 or any other communications method. Blocks to the right of the server are indicative of the processing components and functions which occur in the server's program and data storage indicated by block 35a in FIG. 1A. A TCP/IP "stack" 44 works in conjunction with Operating System 42 to communicate with processes over a network or serial connection attaching Server 20 to internet 45. Web server software 46 executes concurrently and cooperatively with other processes in server 20 to make data objects 50 and 51 available to requesting clients. A Common Gateway Interface (CGI) script 55 enables information from user clients to be acted upon by web server 46, or other processes within server 20. Responses to client queries may be returned to the clients in the form of a Hypertext Markup Language (HTML) document outputs which are then communicated via internet 45 back to the user.

Client 25 in FIG. 1B possesses software implementing functional processes operatively disposed in its program and data storage as indicated by block 35a' in FIG. 1A. TCP/IP stack 44', works in conjunction with Operating System 42' to communicate with processes over a network or serial connection attaching Client 25 to internet 45. Software implementing the function of a web browser 46' executes concurrently and cooperatively with other processes in client 25 to make requests of server 20 for data objects 50 and 51. The user of the client may interact via the web browser 46' to make such queries of the server 20 via internet 45 and to view responses from the server 20 via internet 45 on the web browser 46'.

1.2 Network Overview

Figure 1C:
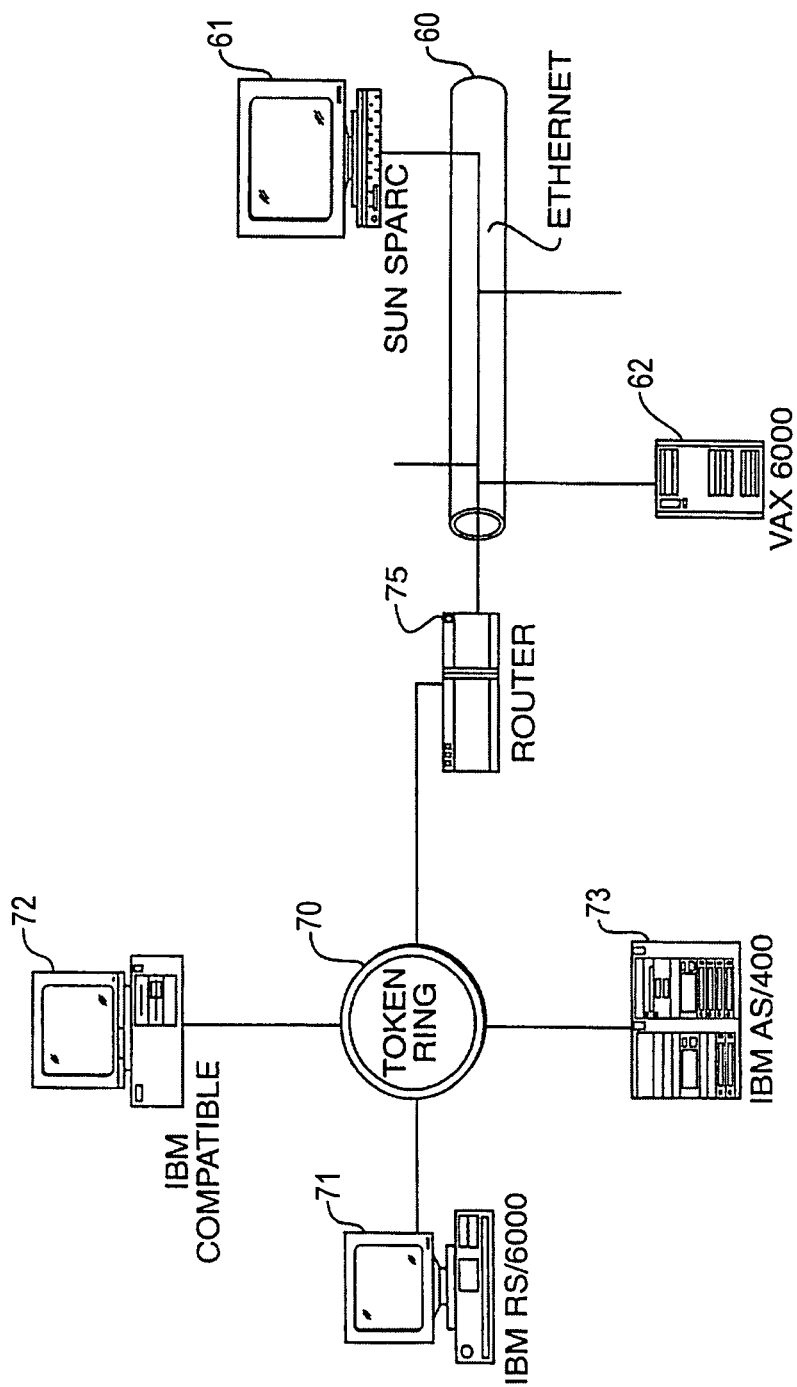
FIG. 1C depicts a representative internetworking environment in accordance with a particular embodiment of the invention.

FIG. 1C is illustrative of the internetworking of a plurality of clients such as client 25 of FIGS. 1A and 1B and a multiplicity of servers such as server 20 of FIGS. 1A and 1B as described herein above. In FIG. 1C, a network 70 is an example of a Token Ring or frame oriented network. Network 70 links a host 71, such as an IBM RS6000 RISC workstation, which may be running the AIX operating system, to a host 72, which is a personal computer, which may be running Windows 95, IBM OS/2 or a DOS operating system, and a host 73, which may be an IBM AS/400 computer, which may be running the OS/400 operating system. Network 70 is internetworked to a network 60 via a system gateway which is depicted here as router 75, but which may also be a gateway having a firewall or a network bridge. Network 60 is an example of an Ethernet network that interconnects a host 61, which is a SPARC workstation, which may be running SUNOS operating system with a host 62, which may be a Digital Equipment VAX6000 computer which may be running the VMS operating system.

Router 75 is a network access point (NAP) of network 70 and network 60. Router 75 employs a Token Ring adapter and Ethernet adapter. This enables router 75 to interface with the two heterogeneous networks. Router 75 is also aware of the Internetwork Protocols, such as ICMP ARP and RIP, which are described below.

Figure 1D:
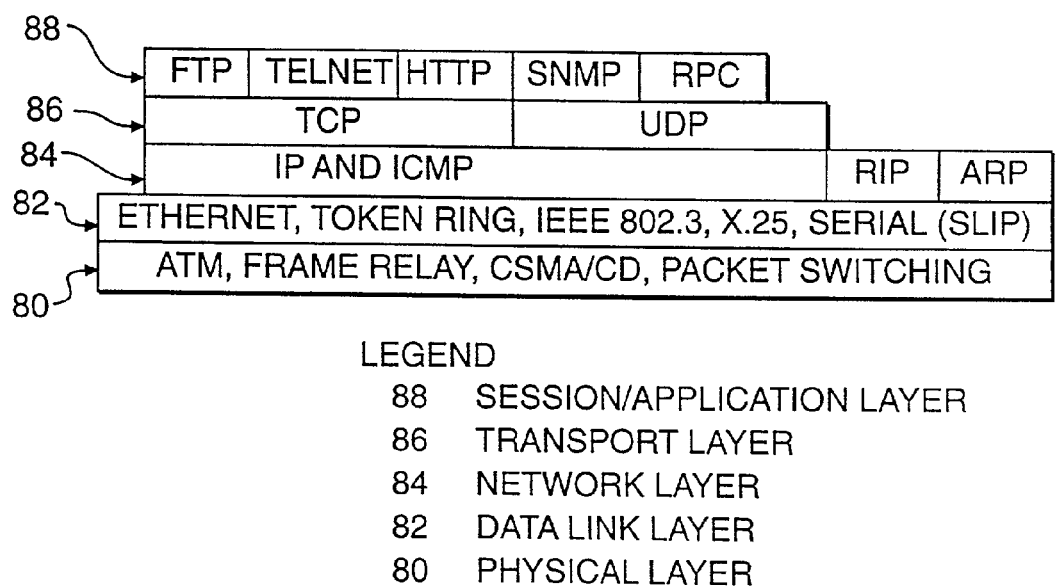
FIG. 1D depicts a relationship diagram of the layers of the TCP/IP protocol suite.

FIG. 1D is illustrative of the constituents of the Transmission Control Protocol/Internet Protocol (TCP/IP) protocol suite. The base layer of the TCP/IP protocol suite is the physical layer 80, which defines the mechanical, electrical, functional and procedural standards for the physical transmission of data over communications media, such as, for example, the network connection 45 of FIG. 1A. The physical layer may comprise electrical, mechanical or functional standards such as whether a network is packet switching or frame-switching; or whether a network is based on a Carrier Sense Multiple Access/Collision Detection (CSMA/CD) or a frame relay paradigm.

Overlying the physical layer is the data link layer 82. The data link layer provides the function and protocols to transfer data between network resources and to detect errors that may occur at the physical layer. Operating modes at the datalink layer comprise such standardized network topologies as IEEE 802.3 Ethernet, IEEE 802.5 Token Ring, ITU X.25, or serial (SLIP) protocols.

Network layer protocols 84 overlay the datalink layer and provide the means for establishing connections between networks. The standards of network layer protocols provide operational control procedures for internetworking communications and routing information through multiple heterogenous networks. Examples of network layer protocols are the Internet Protocol (IP) and the Internet Control Message Protocol (ICMP). The Address Resolution Protocol (ARP) is used to correlate an Internet address and a Media Access Address (MAC) of a particular host. The Routing Information Protocol (RIP) is a dynamic routing protocol for passing routing information between hosts on networks. The Internet Control Message Protocol (ICMP) is an internal protocol for passing control messages between hosts on various networks. ICMP messages provide feedback about events in the network environment or can help determine if a path exists to a particular host in the network environment. The latter is called a "Ping". The Internet Protocol (IP) provides the basic mechanism for routing packets of information in the Internet. IP is a non-reliable communication protocol. It provides a "best efforts" delivery service and does not commit network resources to a particular transaction, nor does it perform retransmissions or give acknowledgments.

The transport layer protocols 86 provide end-to-end transport services across multiple heterogenous networks. The User Datagram Protocol (UDP) provides a connectionless, datagram oriented service which provides a non-reliable delivery mechanism for streams of information. The Transmission Control Protocol (TCP) provides a reliable session-based service for delivery of sequenced packets of information across the Internet. TCP provides a connection oriented reliable mechanism for information delivery.

The session, or application layer 88 provides a list of network applications and utilities, a few of which are illustrated here. For example, File Transfer Protocol (FTP) is a standard TCP/IP protocol for transferring files from one machine to another. FTP clients establish sessions through TCP connections with FTP servers in order to obtain files. Telnet is a standard TCP/IP protocol for remote terminal connection. A Telnet client acts as a terminal emulator and establishes a connection using TCP as the transport mechanism with a Telnet server. The Simple Network Management Protocol (SNMP) is a standard for managing TCP/IP networks. SNMP tasks, called "agents", monitor network status parameters and transmit these status parameters to SNMP tasks called "managers." Managers track the status of associated networks. A Remote Procedure Call (RPC) is a programming interface which enables programs to invoke remote functions on server machines. The Hypertext Transfer Protocol (HTTP) facilitates the transfer of data objects across networks via a system of uniform resource indicators (URI).

The Hypertext Transfer Protocol is a simple protocol built on top of Transmission Control Protocol (TCP). The HTTP provides a method for users to obtain data objects from various hosts acting as servers on the Internet. User requests for data objects are made by means of an HTTP GET request. A GET request as depicted below comprises 1) an HTTP header of the format "http://"; followed by 2) an identifier of the server on which the data object resides; followed by 3) the full path of the data object; followed by 4) the name of the data object. In the GET request shown below, a request is being made of the server "www.w3.org" for the data object with a path name of "/pub/" and a name of "MyData.html":

$$\text{GET http://www.w3.org/pub/MyData.html} \tag{1}$$

Processing of a GET request entails the establishing of a TCP/IP connection with the server named in the GET request and receipt from the server of the data object specified. After receiving and interpreting a request message, a server responds in the form of an HTTP RESPONSE message.

Response messages begin with a status line comprising a protocol version followed by a numeric Status Code and an associated textual Reason Phrase. These elements are separated by space characters. The format of a status line is depicted in line (2):

$$\text{Status-Line=HTTP-Version Status-Code Reason-Phrase} \tag{2}$$

The status line always begins with a protocol version and status code, e.g., "HTTP/1.0 200". The status code element is a three digit integer result code of the attempt to understand and satisfy a prior request message. The reason phrase is intended to give a short textual description of the status code. The first digit of the status code defines the class of response. There are five categories for the first digit. 1XX is an information response. It is not currently used. 2XX is a successful response, the action was successfully received, understood and accepted. 3XX is a redirection response indicating that further action must be taken in order to complete the request. It is this response that is used by certain embodiments of the present invention to cause a client to redirect to a selected server site. 4XX is a client error response. This indicates a bad syntax in the request. Finally, 5XX is a server error. This indicates that the server failed to fulfill an apparently valid request.

Particular formats of HTTP messages are described in, Crocker, D., "Standard for the Format of ARPA Internet Text Messages", STD 11, RFC 822, UDEL, August 1982, which is incorporated by reference herein for all purposes.

2.0 Specific Configurations

Figure 2A:
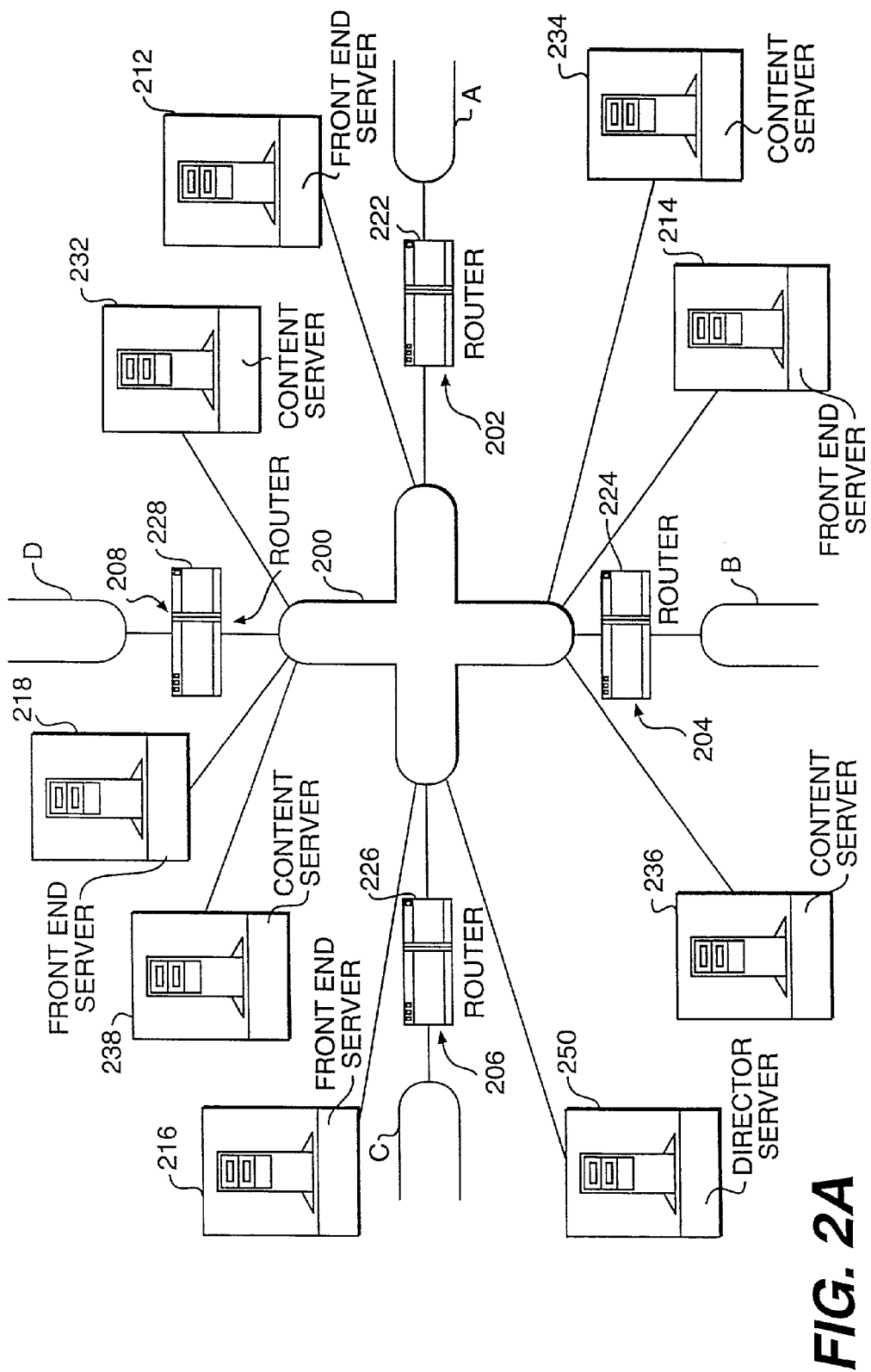
FIG. 2A depicts a distributed computing environment in accordance with a particular embodiment of the invention.

FIG. 2A depicts a representative distributed computing system according to the present invention. In FIG. 2A, a network 200 interconnects a plurality of server machines with one another and to an external internetworking environment via a plurality of Network Access Points (NAPs). The topology of this internal network is completely arbitrary with respect to the invention. It may be Ethernet, Token Ring, Asynchronous Transfer Mode (ATM) or any other convenient network topology. The Network Access Points are points of connection between large networks, and may comprise routers, gateways, bridges or other methods of joining networks in accordance with particular network topologies.

Network access points 202, 204, 206 and 208 provide network reachability to external networks A, B, C and D for communication with client machines via a plurality of external network paths. In a particular embodiment, these Network Access Points house a portion of the routing configuration component. In a preferable embodiment, these NAPs are routers 222, 224, 226 and 228 that peer with other networks and are Open Shortest Path First (OSPF) routing algorithm aware. OSPF is capable of accomodating the case where several machines have exactly the same IP address, by routing packets to the closest machine. By contrast an alternative routing mechanism, Routing Information Protocol (RIP), would not handle this case.

Further, these routers employ IP tunneling techniques, as are well known to persons of ordinary skill in the art, and are policy routing capable, i.e., able to route packets based in part on their source address. Each is configured to use IP tunneling to route packets out of the network through a particular router at a particular NAP, based on packet source addresses and server availability.

FIG. 2A also shows Front End Servers 212, 214, 216 and 218, that are co-located at each NAP. These Front End Servers house a Front End component process. In a preferable embodiment, the Front End Servers also house an IP Relayer component process. Functions of these processes are described hereinbelow.

A Director server 250 houses several software components, which include in the preferable embodiment a Director component, a Ping Manager component, and a Load Manager component, each of which will be described hereinbelow.

One or more Content Servers 232, 234, 236 and 238 perform the actual serving of content, i.e., Web pages or FTP files. Each has associated with it one or more instances of a Content server component capable of serving data such that outgoing packets have a source address that is selectable by the Director component.

Each Content Server has a network alias IP address for each router controlled by the system. For example, in a system with four routers, a particular content server will have four separate network alias IP addresses. Routing within the system is configured for "policy routing", i.e., routing based on the source address of packets, so that depending on which network alias IP address the packets are from, they will be routed through a specific system router chosen by the Director. A series of selectable IP tunnels enable the Content Servers to send data to clients using a "best route". IP tunnels are configured such that each server can serve data out through a chosen network access point. By contrast, systems commonly known in the art serve data routed out of the network through a default peering point, i.e., network exit points that can route to the other networks which make up the Internet. Typically the default peering point is the only peering point for the network. Each IP tunnel is configured to send all data to a different peer router. Every IP tunnel starts at one router, and ends at another (remote) router. This enables a content server farm (one or more content servers in the same physical location, serving behind a router) to serve data through a different content server farm's router if the Director has determined this to be the optimal path.

Routers are statically configured to send packets down an IP tunnel when the packets have a source address that is associated with that IP tunnel. For example, in a network having three peering points the router at a first peering point, call it "A", would have two outgoing tunnels, "tunnel 1" and "tunnel 2". These outgoing tunnels lead to the other two routers, each residing at one of the other two peering points, B and C. The router at peering point A would be configured so that it routes all packets that have a source address of 1.1.1.1 down tunnel 1 and all packets that have a source address of 2.2.2.2 down tunnel 2. Tunnel 1 sends all packets to a second peering point, B, and tunnel 2 sends all packets to a third peering point, C. This is source-based routing, commonly known as "Policy Routing".

A Content Server associated with the router at peering point A runs server software that binds the local side of its server sockets to addresses 1.1.1.1 and 2.2.2.2, enabling it to serve from either address. The Director software possesses configuration information about this Content Server and its server addresses. This enables the Director to determine that when the Content Server serves from the 1.1.1.1 address, all packets are served via tunnel 1 to network access point B, and when the Content Server serves from the 2.2.2.2 address, all packets are served via tunnel 2 to network access point C. The Director software is able to select the NAP through which each Content Server will serve its data by informing the client which fully qualified domain name, corresponding to an IP address, to access for service, since that will be the source address of the request's reply packets. The reply packets are automatically routed through the NAP chosen by the Director software.

This policy routing configuration is set up once for each system during installation. The Director has access to a table of IP addresses for each content server, and the corresponding system router for each of the IP addresses of a particular content server. This enables the Director to select a Content Server IP address that will route through the system router of the Director's choice. The Director must first decide which Content Server has the least load. It formulates this from the data given to it by the Load Manager (which, in turn, collected the data from each of the Load Daemons). Once the Director has chosen the least-loaded Content Server machine, it will choose an address from that machine's set of network alias IP addresses that routes through a router having the best ICMP one-way trip time to the browsing client. It makes this decision based on data given to it by the Ping Manager (which in turn collected its data from the Ping Daemons).

Figure 2B:
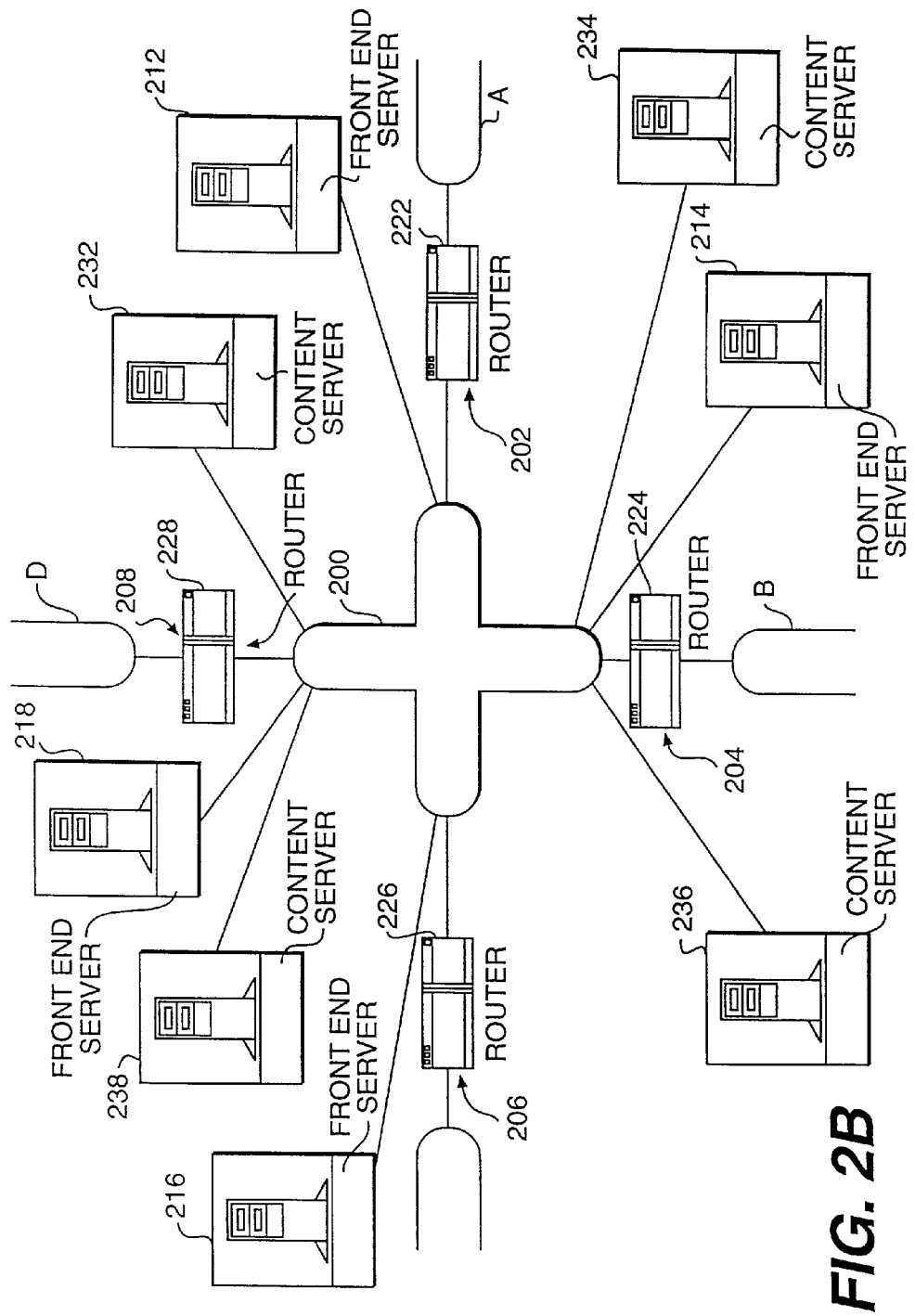
FIG. 2B depicts a distributed computing environment in accordance with an alternative embodiment of the invention.

FIG. 2B depicts an alternative embodiment of a distributed computing system according to the present invention. The embodiment of FIG. 2B differs from the embodiment of FIG. 2A, primarily in that the embodiment of FIG. 2B does not have a separate Director server. Rather, in the alternative embodiment of FIG. 2B, the processes which resided on the Director server 250 in FIG. 2A are distributed among the front end servers 212, 214, 216 and 218, in FIG. 2B.

3.0 Specific Processes

Figure 3A:
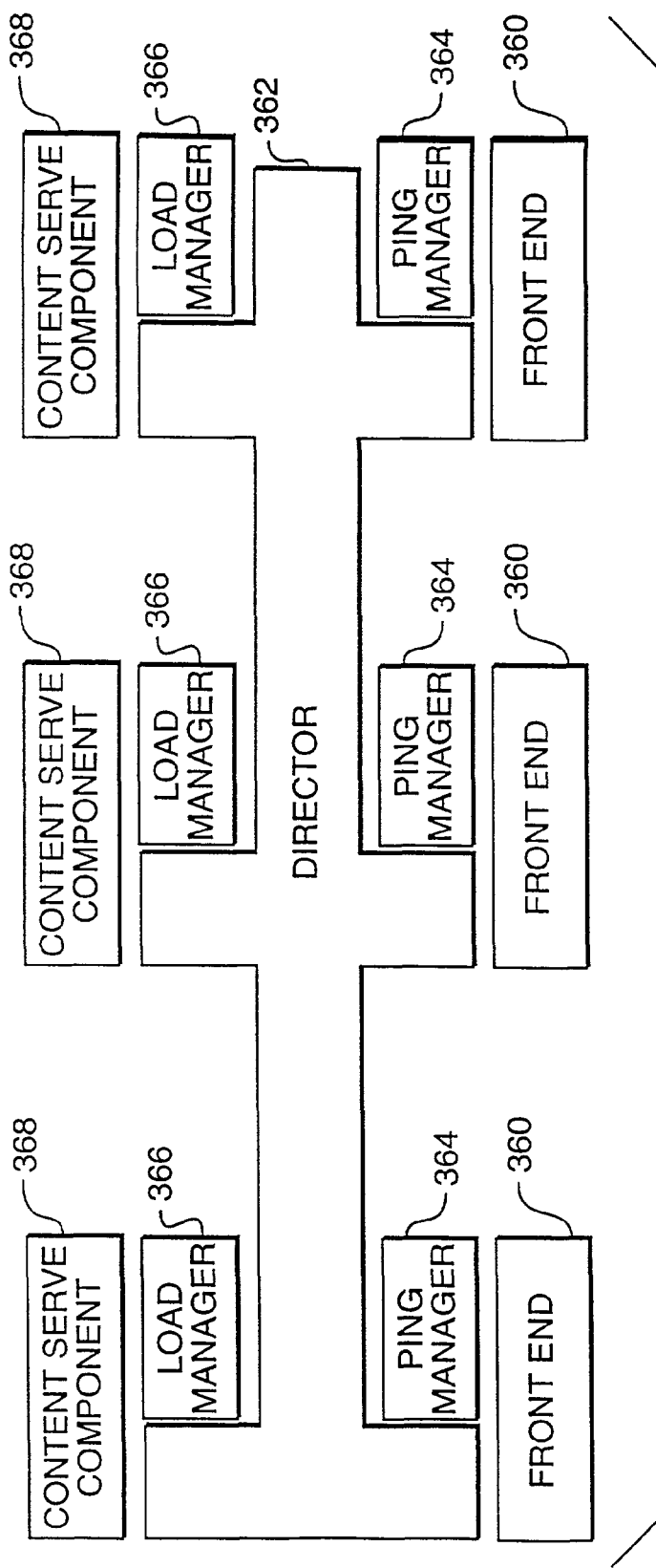
FIG. 3A depicts the relationship of processes in accordance with a representative embodiment of the invention.

FIG. 3A depicts the process components of a representative embodiment according to the present invention.

3.1 Process Components

The Front End—An embodiment of a front-end component 360 receives client requests for data objects. This may be an incoming HTTP request in the preferable embodiment. The front end next solicits "advice" from the director components 362, if available, by immediately sending the browsing client's IP address to the Director, and waiting for the Director to select the "best" server Finally, it sends a reply to the requesting client that directs the client to contact a specific server for further request processing. The front-end must understand the protocol of the client request, and will use application-specific mechanisms to direct the client to the specific server. In a particular embodiment, the front end sends the browser client an HTTP redirection response to the best server's URL. An embodiment of this invention may comprise multiple front-end components that understand one or more user-level protocols.

The Director—An embodiment of a director component 362 receives data queries from front-end components 360 and, using data about the source of the client, preferably, the browsing client's IP address, as well as replicated server status and network path characteristics, preferably ICMP echo response times, received from the collector components, such as the Ping Manager 364 and the Load Manager 366, returns information that enables front-ends to direct user requests. The decision takes all data into account and sends the front end the IP address of the "best" server. Director components include the decision methods to evaluate alternative server selections, and provide coordination for the entire system. An embodiment of this invention comprises one or more director components.

The Collector Components—An embodiment of a collector component monitors one or more characteristics of network paths or content server load, and make this information available to the director component for use in the server selection decision. An embodiment of this invention comprises one or more collector components, preferably, a Ping Manager Component 364, a Ping Daemon Component (not shown), a Load Manager Component 366 and a Load Daemon Component (not shown).

The Ping Manager tells the Director which content server has the fastest ICMP echo path. This data is collected by the Ping Manager 364. The Ping Manager receives its ping-time data from individual server machines which are each using ICMP pings to determine the ICMP routing time between themselves and the browsing client's machine. The Ping Manager then stores this information and reports it to the Director, which uses it to make decisions about the best route.

The Ping Daemon executes on server machines associated with each content server machine cluster. A content server machine (or cluster of them) resides near each of the Network Access Points. The Ping Daemon waits for a ping request (and its corresponding IP address, which is the browsing client's IP address) and then pings the browsing client's IP address to record the ICMP routing time through its own closest border router. It then sends this data back to the Ping Manager.

The Load Manager software is similar to the Ping Manager, but reports and stores information from the Load Daemon about each of the content server machines' current load. It forwards this data to the Director as well.

The Load Daemon runs in conjunction with each content server 368 and reports back to the Load Manager periodically. It sends data about the number of currently open TCP connections, free RAM, free SWAP, and CPU idle time.

Figure 3B:
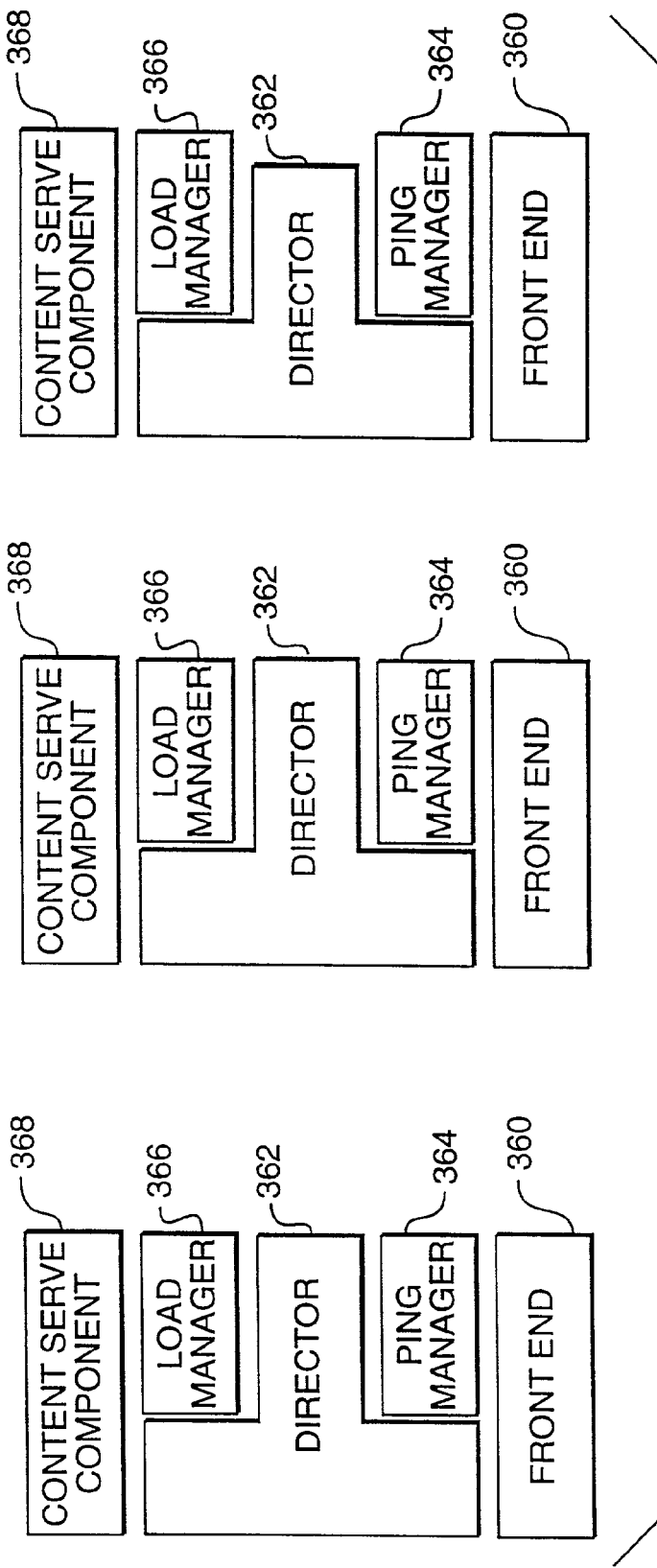
FIG. 3B depicts the relationship of processes in accordance with an alternative embodiment of the invention.

FIG. 3B depicts the software components of an alternative embodiment according to the present invention. Comparing software component diagram of alternative embodiment of FIG. 3B with that of the embodiment in FIG. 3A, the main difference between the two embodiments is that in the alternative embodiment depicted by FIG. 3B, the Director process 362 is distributed among various servers. Thus, in FIG. 3B the Director process 362 is shown as three separate instances of a director process. Whereas, in FIG. 3A the Director process 362 is shown as a singular Director process with interfaces to other processes on multiple servers.

Figure 3C:
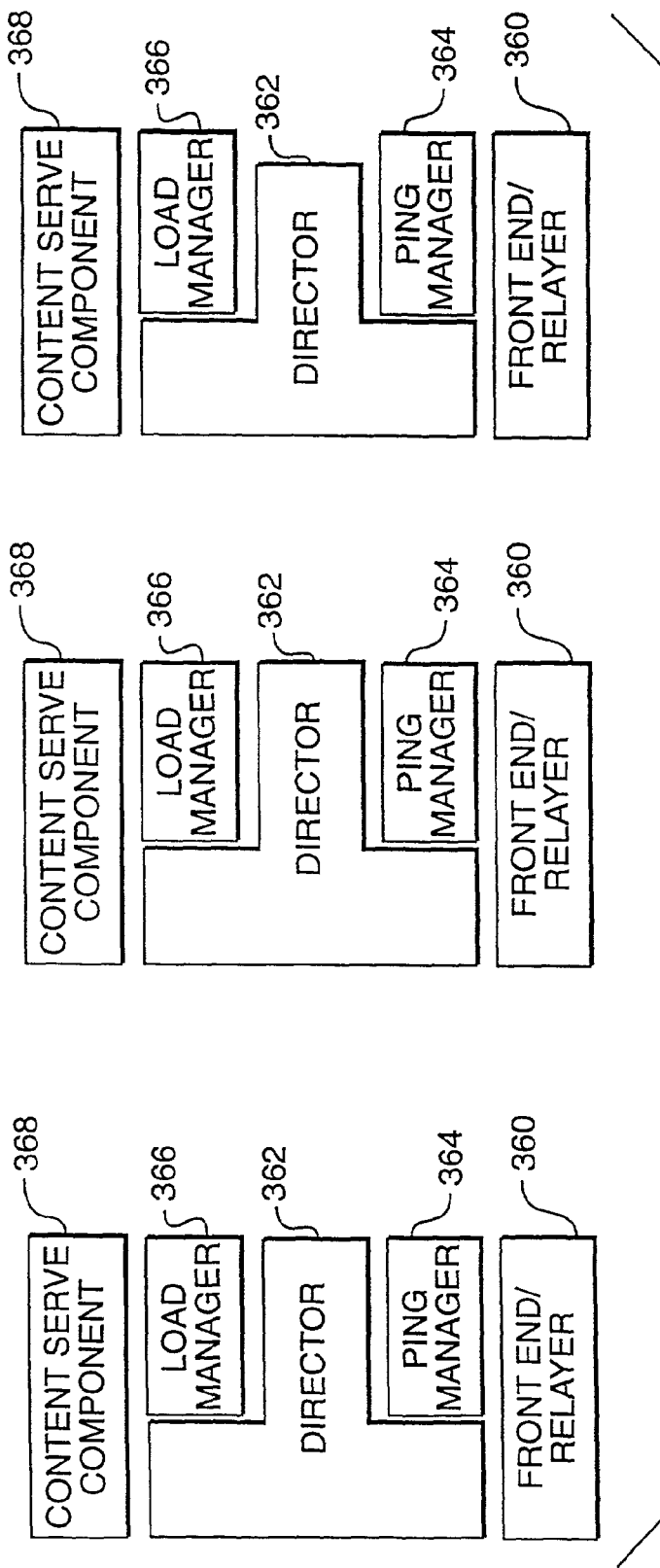
FIG. 3C depicts the relationship of processes in accordance with a preferable embodiment of the invention.

FIG. 3C depicts the software components of a preferable embodiment according to the present invention. Comparing the software component diagram of the embodiment of FIG. 3B with that of the embodiment in FIG. 3C, the main difference between the two embodiments is that in the embodiment depicted by FIG. 3C, the Front End process 360 includes an IP Relayer function.

The Front End/IP Relayer—An embodiment of a front-end/IP Relayer component 360 receives incoming IP packets for any IP traffic. As in the embodiments of FIGS. 3A and 3B, the front end next solicits "advice" from the director components 362, if available, by immediately sending the client's IP address to the Director, and waiting for the Director to select the "best" server. However, rather than directing the client to contact a specific server for further request processing, as is performed by the Front End components in the embodiments of FIGS. 3A and 3B, the IP Relayer forwards the packets to the chosen "best server" in accordance with the determination made by the Director. An embodiment of this invention may comprise multiple front-end components functioning at the IP layer.

3.2 Steps to Service a Request

Figure 4A:
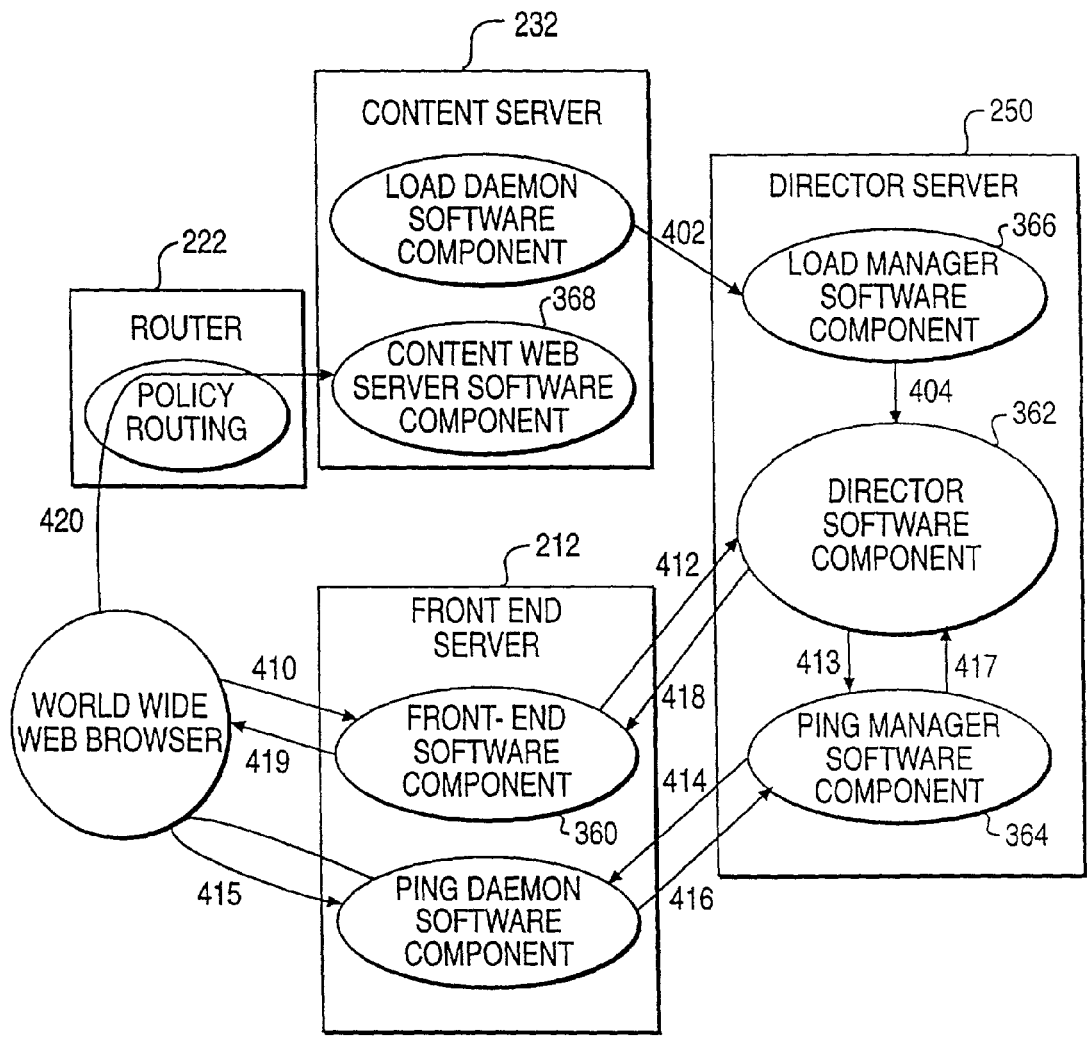
FIG. 4A depicts process steps in accordance with a particular embodiment of the invention.

FIG. 4A depicts a set of steps that occur in the process of receiving, evaluating, and answering a client's request in a particular embodiment of the invention. In a step 402, a load daemon process resident on a content server, such as 232 of FIG. 2A, is periodically updating information directly to a load manager process 366 residing on a Director server 250. Subsequently, in a step 404, Load Manager process updates load information gathered from all content servers having load daemon processes. This enables the Director process 362 to choose the least loaded content server machine responsive to an incoming request such as in steps 410 and 412.

In step 410, an incoming client request, which may be an HTTP request from for example a Web browser, or an FTP request from an FTP client, is routed via an arbitrary external path to a system border gateway, typically a router at a Network Access Point. At this point the client's request becomes an input to the server load balancing distributed computing system of the present invention. It is forwarded to a front-end component 360 by IP acting in accordance with the routing table associated with a router located at this NAP. In step 412, the front-end component, responsive to the arrival of the client application's request, makes a request of the Director component 362 for a preferred server. The Director, having received a front-end request for information about client request in step 412, requests information, such as the most expedient path between servers and clients, from a collector component, such as a Ping Manager 364, in a step 413. In the embodiment of FIG. 4A, the most expedient path is the path with the fastest ICMP echo reply (Ping), determined by a Ping Manager Collector Component 364 acting in conjunction with one or more Ping Daemon Components co-located at the various NAPs in the system network in a step 414. These Ping Daemons determine the fastest ICMP echo path between their particular front end server and the client by transmitting successive Pings to the client via their particular front end server's associated NAP, and timing the response, as depicted in a step 415. Each Ping Daemon from time to time transmits the time to a client via its particular NAP to the Ping Manager in a step 416. The Ping Manager Component returns round trip values for paths associated with the system's NAPs to the client in a step 417. In specific embodiments, the Ping Manager Component may initiate pro-active status queries (not depicted), or may return status information at any time, without explicit requests from the Director component. The Director component indicates the correct content server to be used for the client to the front end component in a step 418. The front-end component directs the client to the correct content server using an application layer protocol, preferably an HTTP redirect response in a step 419. The front-end response is forwarded via a NAP to the client machine by the internetwork using, for example, the IP protocol. Subsequently, as shown in step 420, requests from the client will be made to the best content server, e.g., 232, via the best route to his machine. (Which is also the best place to enter the external network to get to the browsing client's own network provider.)

Figure 4B:
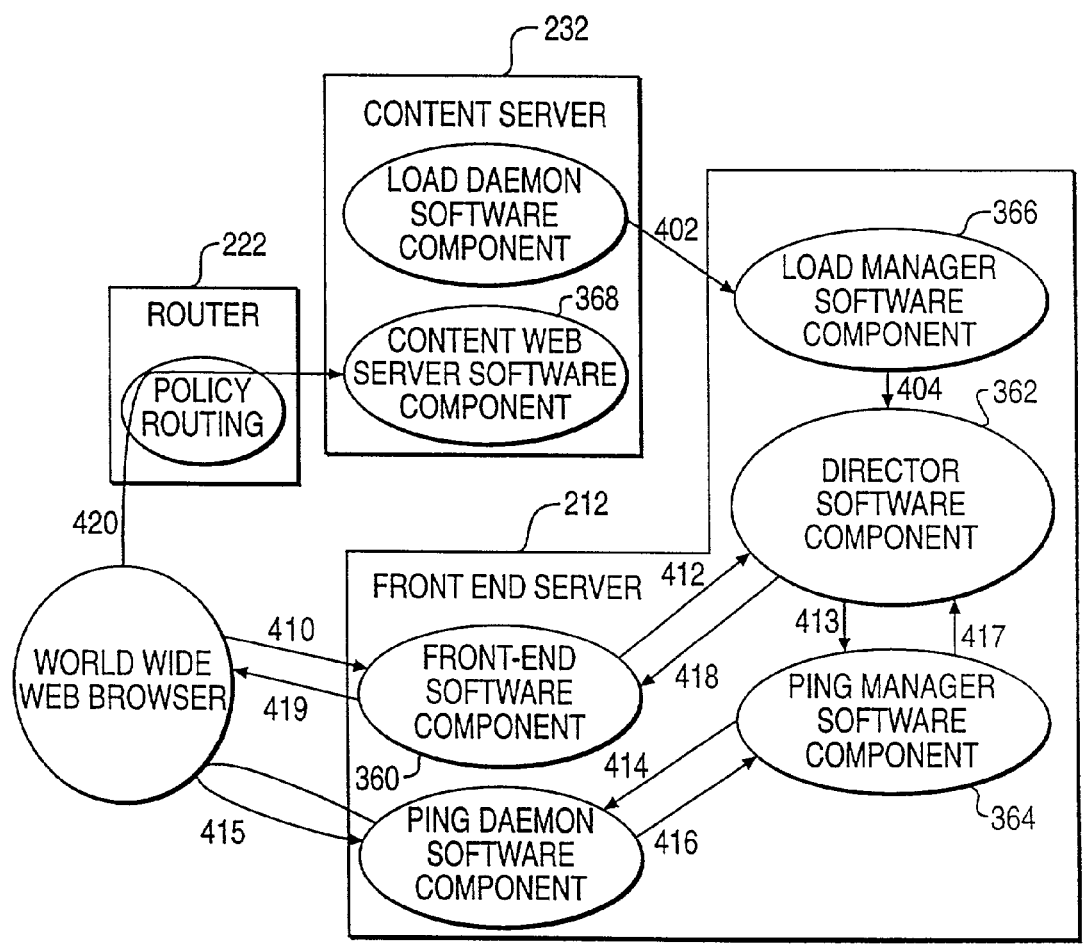
FIG. 4B depicts process steps in accordance with an alternative embodiment of the invention.

FIG. 4B depicts a set of steps that occur in the process of receiving, evaluating, and answering a client's request in an alternative embodiment of the invention. Comparing the processing steps of the embodiment depicted in FIG. 4B with those of the embodiment depicted in FIG. 4A, it is clear that the particular steps are identical. However, it is noteworthy that steps 412, 414, 416 and 418 are not network transactions, as they were in FIG. 4A, but rather transactions between co-resident processes within one server machine.

Figure 4C:
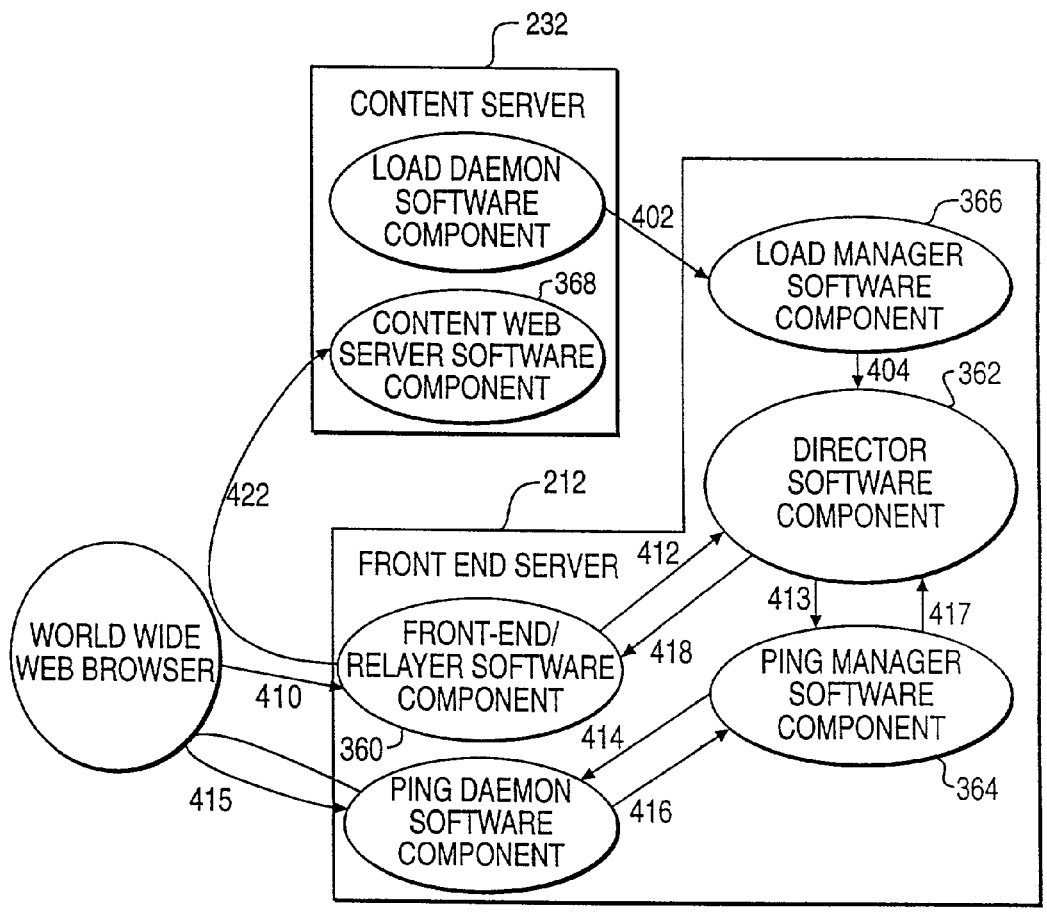
FIG. 4C depicts process steps in accordance with a preferable embodiment of the invention.

FIG. 4C depicts a set of steps that occur in the process of receiving, evaluating, and answering a client's request in a preferable embodiment of the invention. Comparing the processing steps of the embodiment depicted in FIG. 4B with those of the embodiment depicted in FIG. 4C, it is clear that the main difference is that steps 419 and 420 of FIG. 4B, the redirect response and the subsequent HTTP conversation steps, respectively, have been replaced by a new step 422. In step 422, the IP traffic from the client is relayed to the "best server" in accordance with the determination of the Director. This takes the place of the redirect response step 419 being made by the Front End process to the client as is shown in FIG. 4B. It is noteworthy that steps 402, 404, 410, 412, 413, 414, 415, 416, 417 and 418 remain the same in the preferable embodiment of FIG. 4C as in the embodiments of FIGS. 4A and 4B.

FIG. 4C depicts the processing steps in the preferable embodiment. In a step 410, a Front-End/Relayer 360 intercepts packets entering the network. Based upon address information contained within the IP header, the Front-End/Relayer determines the original destination server of the packet. Next, in a step 412, the Front-End/Relayer calls upon the Director 362 to make the "best server" routing decision. In steps 413, 414, 414, 416, 417 and 418, the Director, in conjunction with the Load Manager 366, Ping Manager 364, Load Daemon and Ping Daemon components, determines a "best server" for the IP traffic and communicates this machine's address to the Front-End/Relayer. The decision process is identical to that of the embodiments of FIGS. 4A and 4B. In a step 422, the Front-End/Relayer relays all packets from that client to the "best" server machine. Since the packet relaying takes place at the IP level, packets for any service running over the IP layer can be routed by the methods of the present invention.

4.0 Decision-Making Methodologies 4.1 Director

Figure 5A:
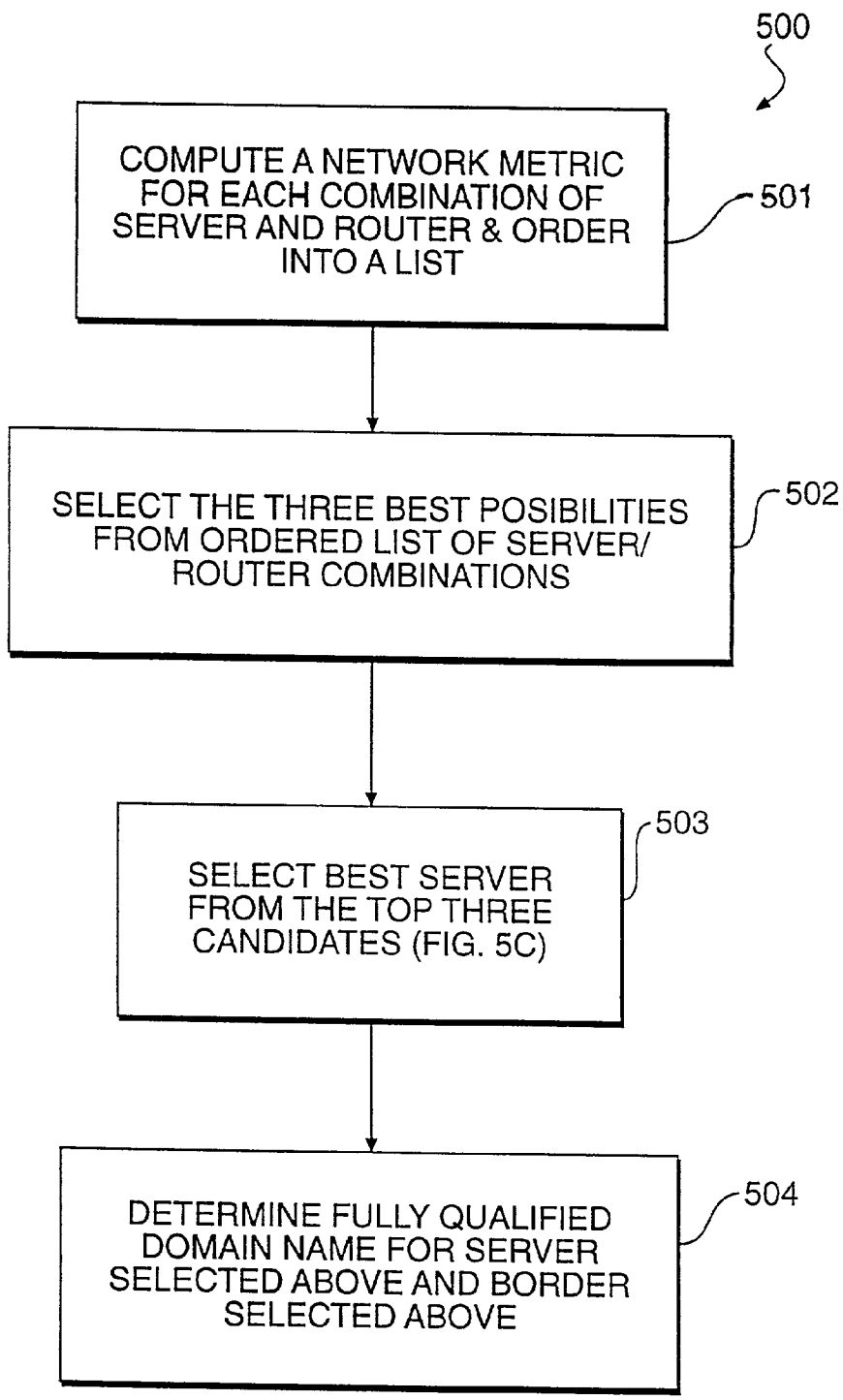
FIGS. 5A-5C depict flow charts of the optimization process within a director component according to a particular embodiment of the invention.

The Director makes decisions about which Content Server and which router is best for each request by a Client. FIG. 5A depicts a flowchart 500 of the process steps undertaken by a Director in a specific embodiment of the invention. In a step 501, a network metric is calculated for each combination of "content server" and "outgoing router". A sorted list is constructed of these metrics, having the format:

$$(site1\ border1\ metric1, \ldots, siteN\ borderN\ metricN) \quad (3)$$

In a step 502, the candidate servers for the best sites are selected from the list produced in step 501, above. Processing traverses the list, selecting the top ranking metric, as well as any candidates that are within a certain percentage (say X %) of the top ranking metric. Note that each content server will be listed with all combinations of outgoing routers in the list. Since it is not necessary to consider server-router combinations which are nonsensical, for example from the LA server going through the NY border need not be considered if there is a combination of LA server going through the LA border, i.e, only consider the "best." For example, with X=5, and the sorted list of combinations (site, border, metric) as is depicted in lines (4):

$$@network=(ny\ ny\ 300\ sj\ la\ 305\ sj\ sj\ 312\ ny\ sj\ 380\ dc\ ny\ 400\ldots) \quad (4)$$

The first three entries are:
ny ny 300
sj la 305
sj sj 312

Since these are all within 5% of each other, the system will consider all three. However, note that San Jose is listed twice, and that the time of the second listing is longer than the time of the first. The first appearance of San Jose server therefore, is preferred over the second, thus the second is discarded in favor of the first. A server in either NY or SJ is selected. If a server in NY is chosen, then the border in NY will also be selected. If a server in SJ is chosen, the border in LA is "best."

In a step 503, the "best" server is selected from the candidates. Make a list of all of the metrics for candidate servers, and apply a statistical algorithm to select the best server from the candidates. The result of this step is the site for the selected server, and an identifier for the specific server. (There may be multiple servers at each site).

In a step 504, from the site of the server selected above, the system recalls which border is to be used for that site saved in step 502. Then, from the server identifier and the outgoing border, the correct fully qualified domain name that has the appropriate IP address for the internal policy routing is determined.

4.2 Ping Manager

The Ping Manager constantly requests ping information from one or more Ping Daemons. The Ping Manager sends to the Director a sequence of values representative of the round trip time to-and-from every client site. Non-responsive client sites are represented by an arbitrary large value if a Ping Daemon does not respond. In a particular embodiment a Ping Manager will send to a Director a sequence such as depicted by lines (5) and (6) below:

"client_address metric_site_1 metric_site2 ... metric_site_N\n" (5)

"128.9.192.44 300 9999999 280 450\n" (6)

In a preferred embodiment the site metrics are ordered.

@incoming_metric_order=('ny','la','dc','sj') (7)

Figure 5B:
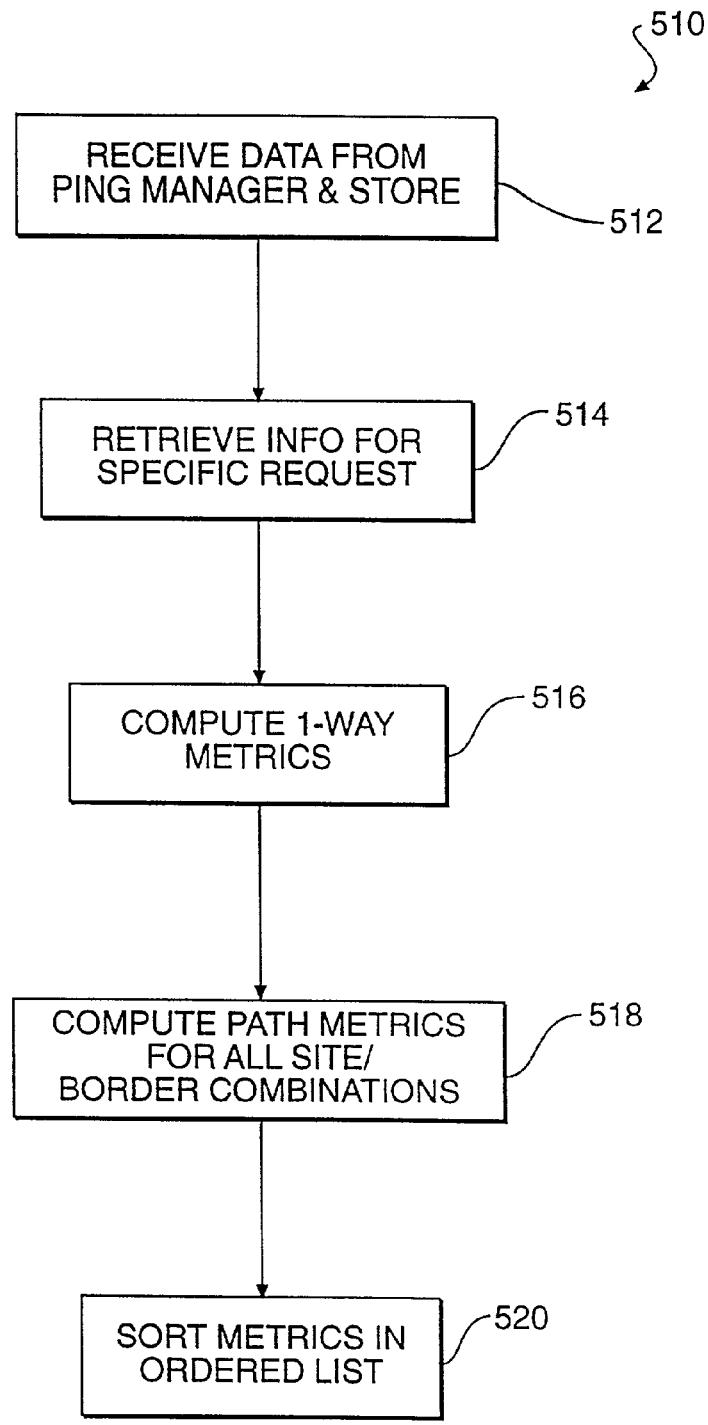

FIG. 5B depicts a flowchart 510 of the process steps performed by the Director in response to receiving from the Ping Manager the sequence of information depicted in lines (5) and (6) above. In a step 512 of flowchart 510, the Director performs processing on the incoming information from the Ping Manager to store the information in a usable format as depicted by the pseudocode in lines (8) herein below.

```
($addr,@metrics)=split(",$incoming_pingmgr_message);
$ping_cache{$addr}=$incoming_ping_message;
$ping_cache_time{$addr}=&get_current_time();
#Store round-trip ping metrics in useful format.

@temp_keys=@incoming_metric_order;
while($value=shift(@metrics)){
$key=shift(@temp_keys);
$ping{$key}=$value;
}                                                           (8)
```

Next, in a step 514, in response to a request received from a Front End process, the Director will retrieve information about that request to be answered. Lines (9) depict pseudocode for processing step 514:

```
#Retrieve info about the request that must be answered.

$request_frontend=$request_frontend{$addr};#who gets reply
$contact_site=$request_contact{$addr};#need for path calcs    (9)
```

In a step 516, the Director calculates one-way metrics from the two-way metrics provided by the Ping Manager according to the following pseudocode in lines (10):

```
#Calculate one-way metrics.

$p1way{$contact_site}=$ping{$contact_site}/2;
foreach$border('ny','la','dc','sj'){
next if($border eq$contact_site);
$p1way{$border}=$ping{$border}
-$p1way{$contact_site}
-$internal{"$contact_site$border"};
}                                                           (10)
```

Next, in a step 518, the Director calculates path metrics for all site and border combinations according to the following pseudocode in lines (11):

```
##Calculate the path metrics for all site/border combinations.

foreach$site('ny','la','dc','sj'){
foreach$border('ny','la','dc','sj'){
#This calculates round-trip from server,through border,
#to client,back through 1st contact border,to server.
#It assumes that $ping{ }array has one-way metric times.
#Also use $internal{ }associate array.

#We weigh outgoing path components twice as much,
#because we believe it is more important to consider
#outgoing data path.

$metric=2*$p1way{$border}+
2*$internal{"$site $border"}+
$p1way{$contact_site}+
$internal{"$border$contact_site"};
#save it for easy sorting

$path{$metric}=($path{$metric})?
"$path{$metric}$site$border":"$site$border";
}
}                                                           (11)
```

Next, in a step 520, the Director sorts the metrics and constructs an ordered list using the following pseudocode in lines (12):

```
#Sort metrics and construct required list in order.

foreach$metric(sort keys%path){
@list=split(",$path{$metric});
while(@list){
$site,=shift(@list);
$border=shift(@list);
```

```
push(@sorted_list,$site,$border,$metric);

}

}                                                        (12)
```

At this point, variable @sorted_list contains all the information needed to select pairs of sites and candidate servers.

4.3 Load Manager

The Load Manager sends messages to the Director about once every two seconds, in the format depicted in line (13):

"server1 load1 server2 load2 ... serverN loadN";    (13)

Figure 5C:
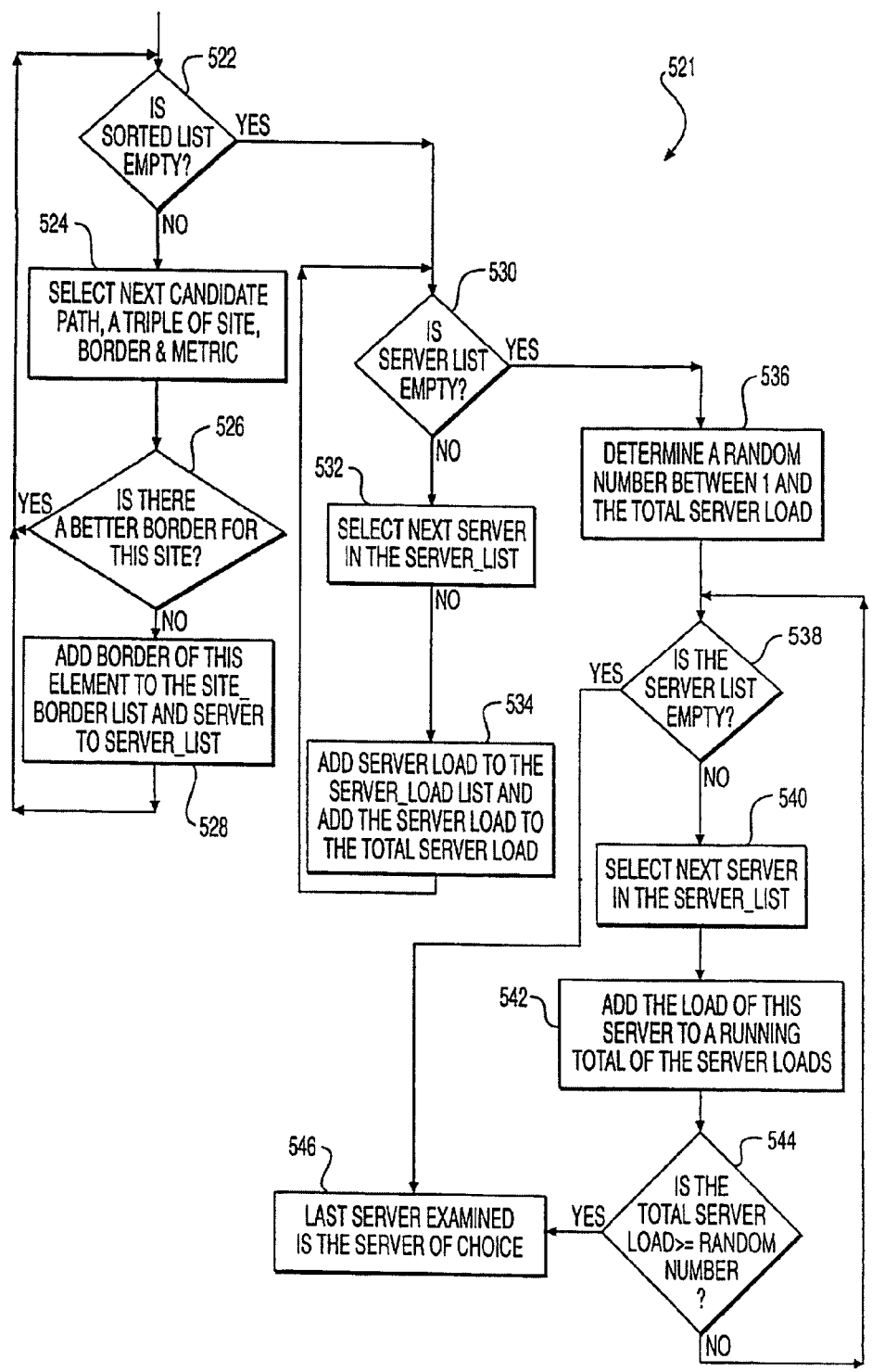

FIG. 5C depicts a flowchart 521 of the process steps performed by the Director in selecting a "best" server, using the information received from the Load Manager, depicted in line (13) above, and the Ping Manger, depicted in lines (5) and (6) above.

The Director maintains several internal data structures, including an associative array of server loads, pairs load values with server identifiers:

$load_array{$serverID}=$load;

a list of servers at each site:

$servers{'la'}="www.la1.test.com www.la2.test.com";
$servers{'dc'}="www.dc1.test.com www.dc2.test.com";

a mapping of servers and borders into a correct name that has a corresponding source address:

$server_map{"www.la1.test.com la"}="www.la1-la.test.com";
$server_map {"www.la1.test.com dc"}="www.la1-dc.test.com";

The variable @sorted_list, generated above, contains triples of sites, borders, and path metrics. From these data structures, the Director can choose an optimal server using the steps shown in FIG. 5C. A decisional step verifies that all entries in the @sorted_list have not been processed, and initializes the "best_metric" variable to the metric of the first member of the @sorted_list. These steps are depicted in the following pseudocode:

```
%site_border=( );
@server_list=( );
Top loop chooses next set of candidate paths (and sites);
loop is broken when we have selected a server.

while (1) {
break unless (@sorted_list);
$best_metric=$sorted_list[2]*$fuzz_factor; # $fuzz_factor=1.05;
```

As shown in FIG. 5C, a decisional step 522, a process step 524, a decisional step 526, and a process step 528 implement a looping construct for selecting triples of site, border and metric from the @sorted_list and adding the border information to a site border list and the site to a server list. This is also depicted in the following pseudocode:

```
while (@sorted_list && ($sorted_list[2]<=$best_metric))
{
   $site=shift(@sorted_list);
   $border=shift(@sorted_list);
   $metric=shift(@sorted_list);
   # check if site already has better outgoing border
   if (! $site_border {$site}) {
      $site_border{$site}=$border;
      push(@server_list, split(", $servers{$site}));
   }
}
```

Once this loop has processed all members of the @sorted_list, decisional step 522 will take the "yes" path, and processing will continue with a decisional step 530, which, along with process steps 532 and 534, implements a looping construct for processing all servers in the server list generated above, and adding each server's load to a server load list, and totaling the loads of all servers in a $total variable. This is also depicted in the following pseudocode:

```
@server_load=( );
$total=0;
foreach $server (@server_list) {
   push(@server_load, $load_array {$server});
   $total+=$load_array {$server};
}
next unless ($total); # check for all servers busy
```

Once this loop has processed all members of the @server_list, decisional step 530 of FIG. 5C will take the "yes" path, and processing will continue with a process step 536, which determines a random number between 1 and the total server load. Next, processing continues in the loop formed by decisional steps 538 and 544 and processing steps 540, 542, and 546. This loop steps through the servers in the @server_list, summing their loads until this running total exceeds the random number selected in process step 536, or until the last member of the @server_list has been processed. In either case, the server being examined when either of these two conditions is fulfilled, is the server selected by the Director as the "best" server. This is also depicted in the following pseudocode:

```
# tricky to handle fencepost values.
# Should return value between 1 and $total (inclusive);

$random=roll_dice($total);
$total=0;
while ($the_server=shift(@server_list)) {
   $value=shift(@server_load);
   next unless ($value);
   $total+=$value;
   last if ($random<=$total);
}
last; ## We have answer, break out of while loop . . .
}
```

Once the director has selected a "best" server, processing continues as described by step 504 of FIG. 5A, and the following pseudo code:

```
# Selected server is at which site???

$site=$get_site {$the_server};
# Recall information about best border for this site

$border=$site_border {$site};
# Get the correct name which will use source address we
   need.

$response_to_request=$server_map {"$the_server $border"};
```

5.0 Conclusion

In conclusion, it can be seen that the present invention provides for an internetworked system wherein data objects are served to users according to the shortest available network path. A further advantage to the approaches according to the invention is that these methods exhibit tolerance of faults occurring in the underlying hardware. Additionally, reliability of systems according to the invention are increased over prior art web servers. Other embodiments of the present invention and its individual components will become readily apparent to those skilled in the art from the foregoing detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive. It is therefore not intended that the invention be limited except as indicated by the appended claims.

What is claimed is:

1. A method of routing requests for data objects from clients comprising:
   receiving a request for a data object from a client;
   providing content servers capable of serving data objects;
   determining a best server from the content servers to serve said data object to said client, the determining including
      for each content server, identifying routes between the content server and the client,
      determining traversal times for the routes,
      ranking the routes according to the traversal times,
      determining, based on the ranked routes, a set of candidate servers associated with routes having associated traversal times within a predetermined range of the traversal time of a top ranked route, the set of candidate servers including a candidate server associated with the top ranked route and at least one other candidate server associated with another of the ranked routes, and
      iterating through the candidate servers to select the best server, the iterating including incrementing a running total of candidate server load based on respective server loads of the candidate servers, and identifying the best server when at least one of: (a) the running total of candidate server load exceeds a randomly determined amount of server load and (b) the last candidate server is reached; and
   informing the client of an address associated with the determined best server accessible by the selected route.

2. A method as recited in claim 1, further comprising:
   identifying current load on each content server; and
   using the determined current load of each content server as the respective server loads when incrementing the running total of candidate server load.

3. A method as recited in claim 1, further comprising determining a best network border associated with the determined best server.

4. A method as recited in claim 3, wherein the best network border is a router.

5. A method as recited in claim 3, further comprising determining the best network border as being the network border that is geographically closest to the determined best server.

6. A method as recited in claim 1, further comprising removing at least a first candidate server from the set of candidate servers prior to selecting the best server, upon determining that the first candidate server is in a same geographic region as a second server included in the set of candidate servers.

7. A method as recited in claim 1, wherein the predetermined range is a predetermined percentage of the traversal time associated with the routes.

8. A method as recited in claim 1, further comprising determining the randomly determined amount of server load as a random number within a range of one to the total load capacity of the content servers.

9. A system for routing requests for data objects from clients comprising:
   content servers configured to serve the data objects; and
   a director component configured to select a content server from the content servers, the director component including:
      an identification component configured to identify, for each content server, routes between the content server and a requesting client;
      a determination component configured to determine traversal times for the routes; and
      a route selection component configured to:
         rank the routes according to the traversal times,
         determine, based on the ranked routes, a set of candidate servers associated with routes having associated traversal times within a predetermined range of the traversal time of a top ranked route, the set of candidate servers including a candidate server associated with the top ranked route and at least one other candidate server associated with another of the ranked routes,
         iterate through the candidate servers to select a best server from the set of candidate servers to serve said data object to said client, the iterating including to increment a running total of candidate server load based on respective server loads of the candidate servers, and identifying the best server when at least one of: (a) the running total of candidate server load exceeds a randomly determined amount of server load and (b) the last candidate server is reached,
         and
         identify an address associated with the selected best server accessible by the selected route.

10. A system as recited in claim 9, the director component further comprising:
    a second determination component configured to determine current load on each content server; and
    the route selection component further configured to use the determined current load of each content server as the respective server loads when incrementing the running total of candidate server load.

11. A system as recited in claim 9, wherein the route selection component is further configured to determine a best network border associated with the selected best server.

12. A system as recited in claim 11, wherein the best network border is a router.

13. A system as recited in claim 11, wherein the route selection component is further configured to determine the best network border as being the network border that is geographically closest to the selected best server.

14. A system as recited in claim 9, wherein the route selection component is further configured to remove at least a first candidate server from the set of candidate servers prior to selecting the best server, upon determining that the first candidate server is in a same geographic region as a second server in the set of candidate servers.

15. A system as recited in claim 9, wherein the predetermined range is a predetermined percentage of the traversal time associated with the routes.

16. A system as recited in claim 9, wherein the route selection component is further configured to determine the randomly determined amount of server load as a random number within a range of one to the total load capacity of the content servers.

17. A computer program product residing on a non-transitory computer readable medium for routing requests for data objects by a client of content servers configured to serve the data objects, comprising instructions for causing a computer to:
- receive a request for a data object from the client;
- for each content server, identify routes between the content server and the client;
- determine traversal times for the routes;
- rank the routes according to the traversal times;
- determine, based on the ranked routes, a set of candidate servers associated with routes having associated traversal times within a predetermined range of the traversal time of a top ranked route, the set of candidate servers including a candidate server associated with the top ranked route and at least one other candidate server associated with another of the ranked routes;
- iterate through the candidate servers to select a best server from the set of candidate servers to serve said data object to said client, the iterating including to increment a running total of candidate server load based on respective server loads of the candidate servers, and identifying the best server when at least one of: (a) the running total of candidate server load exceeds a randomly determined amount of server load and (b) the last candidate server is reached;

and

- inform the client of an address associated with the selected best server.

18. A computer program product as recited in claim 17, further comprising instructions for causing the computer to:
- determine current load of each content server; and
- use the determined current load of each content server as the respective server loads when incrementing the running total of candidate server load.

19. A computer program product as recited in claim 17, further comprising instructions for causing the computer to determine a best router associated with the selected best server.

20. A computer program product as recited in claim 19, further comprising instructions for causing the computer to determine the best router as being the router that is geographically closest to the selected best server.

21. A computer program product as recited in claim 17, further comprising instructions for causing the computer to remove at least a first candidate server from the set of candidate servers prior to selecting the best server, upon determining that the first candidate server is in a same geographic region as a second server included in the set of candidate servers.

22. A computer program product as recited in claim 17, wherein the predetermined range is a predetermined percentage of the traversal time associated with the routes.

23. A computer program product as recited in claim 17, further comprising instructions for causing the computer to determine the randomly determined amount of server load as a random number within a range of one to the total load capacity of the content servers.

* * * * *